United States Patent Office 3,778,443
Patented Dec. 11, 1973

3,778,443
4-TETRAHYDRO PYRIDYL, HYDROXY ALKYL PYRAZOLES
Vishwa Prakash Arya, Bombay, India, assignor to Ciba-Geigy AG
No Drawing. Original application Feb. 13, 1969, Ser. No. 705,013, now Patent No. 3,652,573. Divided and this application Sept. 21, 1971, Ser. No. 182,555
Int. Cl. C07d 31/48
U.S. Cl. 260—294.8 R         6 Claims

ABSTRACT OF THE DISCLOSURE

The compounds of the formula

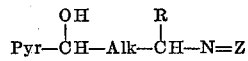

in which N=Z denotes an N-azacycloaliphatic residue containing 5–8 ring members and at most one carbon-carbon double bond, Pyr denotes a 4-pyrazolyl residue optionally substituted in 1-position by lower alkyl or hydroxy-lower alkyl, Alk represents a 1:1-lower alklidene residue, an R denotes a hydrogen atom or a lower alkyl group, or salts thereof have antihypertensive, as well as antitussive or anti-inflammatory properties.

CROSS-REFERENCE TO RELATED APPLICATION

This is a divisional of application Ser. No. 705,013, filed Feb. 13, 1968, now U.S. Pat. No. 3,652,573.

SUMMARY OF THE INVENTION

The present invention concerns and has for its objects the azacycloaliphatic compounds of the Formula A, in which Pyr, X, Alk, R and —N=Z have the above meaning, or salts thereof, process for their preparation and compositions containing them. The compounds of Formula A and salts thereof, as well as compositions containing them are useful as pharmaceutical, particularly antihypertensive, as well as antitussive, or antiinflammatory agents.

DESCRIPTION OF THE PREFERRED EMBODIMENTS

The N-azacycloaliphatic residue —N=Z is a N-monoazacycloaliphatic residue and represents primarily a six-membered N-monoazacycloaliphatic residue having at most one double bond in the ring, such as a piperidino, as well as a 1,4,5,6- or especially a 1,2,5,6-tetrahydropyridyl residue; it may also denote a pyrrolidino, hexahydroazepino or octahydroazocino group. The residue N=Z may optionally contain in the cycloaliphatic portion an oxygen or sulphur atom as ring member, and represent, for example, a 4-morpholino or 4-thiamorpholino group. The N-azacycloaliphatic residue may be unsubstituted, but preferably contains one, two or more substituents, with one ring carbon of the N-azacycloaliphatic residue optionally being substituted by one or two identical or different groups, or one or two ring carbon atoms being substituted by a bivalent substituent. Two non-adjacent ring carbon atoms may also tbe connected with each other by a direct bond, two, preferably non-adjacent, ring-carbon atoms by a hetero, e.g. an oxygen atom. Suitable substituents are, for example, optionally substituted, monovalent or bivalent hydrocarbon residues, heterocyclic residues, acyl residues or free or functionally modified carboxyl groups, as well as free or functionally converted hydroxyl or free or substituted amino groups.

Hydrocarbon residues which should be quoted are aliphatic hydrocarbon residues, preferably having at most 7 carbon atoms, for example, lower alkyl, e.g. methyl or ethyl, linear or branched propyl, butyl or pentyl, bonded at any desired position, lower alkenyl, e.g. allyl or methallyl, or lower alkinyl, e.g. propargyl, as well as cycloaliphatic hydrocarbon residues, preferably having 3–8 ring carbon atoms, such as cycloalkyl, e.g. cyclopentyl or cyclohexyl, or alicyclicaliphatic hydrocarbon residues, preferably having 3–8 ring carbon atoms and at most 7 chain carbon atoms, such as cycloalkylalkyl, e.g. cyclopentylmethyl, cyclohexylmethyl or cyclohexylethyl, aromatic hydrocarbon residues, particularly monocyclic or bicyclic residues of this type, e.g. phenyl or naphthyl, or araliphatic hydrocarbon radicals, such as phenyl-lower alkyl or naphthyl-lower alkyl, e.g. benzyl, phenylethyl, diphenylmethyl or naphthylmethyl. Bivalent hydrocarbon residues are especially those of aliphatic type, such as lower alkylene groups having at most 7 carbon atoms, e.g. methylene, 1,2-ethylene, 2,2-propylene, 1,3-propylene, 1,4-butylene or 1,5-pentylene radicals, in which the chain carbon atoms may optionally be replaced by hetero-atoms e.g. nitrogen or oxygen atoms.

These hydrocarbon residues may optionally be mono-, di- or poly-substituted. Thus, for example, aliphatic hydrocarbon residues contain as substituents free or substituted hydroxyl or mercapto groups, such as etherified hydroxyl or mercapto groups having preferably up to 7 carbon atoms, for example, lower alkoxy, e.g. methoxy or ethoxy, or lower alkylmercapto, e.g. methylmercapto or ethylmercapto, or esterified hydroxyl groups, preferably having up to 7 carbon atoms, for example, lower alkanoyloxy, e.g. acetyloxy, or reactive esterified hydroxy groups, such as sulfonyloxy groups, e.g. phenylsulfonyloxy groups, or halogeno, e.g. fluoro, chloro or bromo, or acyl, preferably having up to 7 carbon atoms, such as lower alkanoyl, e.g. acetyl or propionyl, or carbo-lower alkoxy, e.g. carbethoxy, or free or substituted amino, primarily mono- or di-lower alkylamino, e.g. methylamino, dimethylamino, ethylamino or diethylamino, or alkyleneamino, oxaalkyleneamino or azaalkyleneamino, having up to 8 ring members, e.g. pyrrolidino, piperidino, morpholino, piperazino, 4-lower alkylpiperazino, for example, 4-methyl-piperazino, or 4-hydroxy-lower alkyl-piperazino, for example, 4-(2-hydroxyethyl)-piperazino, in which one substituent of the nitrogen atom may also be bonded to the aliphatic hydrocarbon residue, as in 1-lower alkyl-4-piperidyl, e.g. 1-methyl-piperidyl, or as in 1-lower alkyl-3-pyrrolidyl-lower alkyl, e.g. 1-methyl-3-pyrrolidylmethyl. Substituents of cycloaliphatic hydrocarbon residues are primarily lower alkyl, preferably having up to 7 carbon atoms, whereas aromatic residues may contain as substituents the above-mentioned substituents, primarily lower alkyl, lower alkoxy, lower alkylmercapto, lower alkanoyloxy, halogeno, trifluoromethyl, carbo-lower alkoxy, lower alkanoyl or free or substituted amino, as well as nitro or lower alkylenedioxy, e.g. methylenedioxy.

The heterocyclic substitutents of the azacycloaliphatic group are especially monocyclic, as well as bicyclic heterocyclic residues having aromatic properties, primarily monocyclic azacyclic, as well as oxacyclic or thiacyclic residues of this type, for example, pyridyl, e.g. 2-, 3- or 4-pyridyl, as well as furyl, e.g. 2-furyl, or thienyl, e.g. 2-thienyl, but also bicyclic heterocyclic residues, preferably benzoazacyclic residues of aromatic character, in which the azacyclic rnig contains 5–6 ring members and up to three nitrogen atoms or one or two nitrogen atoms together with an oxygen or a sulphur atom as ring members, as, for example, the bicyclic heterocyclic groups described below which may substitute the 1-position of the 4-pyrazolyl residue. The heterocyclic residues may optionally contain the above-mentioned substituents of a hydrocarbon residue and may, in particular, be substituted like the above-mentioned aromatic residues and/or linked to the N-azacycloaliphatic residue via an aliphatic hydrocarbon radical, such as a lower alkylene radical.

An acyl residue optionally substituting the N-azacycloaliphatic residue may, for example, denote the residue of an aliphatic carboxylic acid, especially a lower alkanecarboxylic acid, which preferably contains up to 7 carbon atoms, e.g. acetic, propionic, n-butyric, isobutyric or pivalic acid, as well as the acyl residue of a cycloaliphatic carboxylic acid, which preferably contains 3–8 ring carbon atoms, such as a cycloalkane carboxylic acid, e.g. cyclopentanecarboxylic or cyclohexanecarboxylic acid, or a cycloaliphatic-aliphatic carboxylic acid, which preferably contains 3–8 ring carbon atoms and up to 7 chain carbon atoms, such as a cycloalkyl-lower alkanecarboxylic acid, e.g. cyclopentylpropionic or cyclohexylacetic acid, or the acyl group of an aromatic carboxylic acid, preferably a monocyclic or bicyclic aromatic carboxylic acid, e.g. benzoic acid, an araliphatic, preferably a monocyclic or bicyclic, araliphatic carboxylic acid, such as phenyl-lower alkane carboxylic, e.g. phenylacetic acid, or a heterocyclic, especially a monocyclic, azacyclic, oxacyclic or thiacyclic, carboxylic acid of aromatic character, e.g. nicotinic or isonicotinic acid. The acyl residue of such organic carboxylic acids may optionally contain the above-mentioned substituents, such as those of the previously mentioned hydrocarbon residues.

Functionally modified carboxyl groups which may occur as substituents of the azacycloaliphatic residue apart from free carboxyl groups, are primarily esterified carboxyl groups, such as carbo-lower alkoxy, e.g. carbomethoxy, carbethoxy, carbo-n-propyloxy or carbo-n-butyloxy, as well as nitrogen-containing functionally converted carboxyl groups, such as optionally N-substituted carbamyl, e.g. carbamyl or N-lower alkyl-carbamyl, such as N-methyl-carbamyl, N,N-dimethyl-carbamyl, N-ethyl-carbamyl or N,N-diethyl-carbamyl, or cyano.

Free or functionally converted hydroxyl groups are also possible substituents of the N-azacycloaliphaticresidue; the latter are, for example, etherified hydroxyl groups, such as lower alkoxy or lower alkenyloxy having preferably up to 7 carbon atoms, e.g. methoxy, ethoxy, n-propyloxy, isopropyloxy allyloxy, or esterified hydroxyl groups, such as carbamoyloxy, N-lower alkylcarbamoyloxy, N,N-di-lower alkylcarbamoyloxy, lower alkoxy-carbonyloxy or lower alkanoyloxy, in which the carbamyl, carbo-lower alkoxy and lower alkanoyl residues have the significance given above, or halogeno, e.g. fluoro, chloro or bromo, as well as organic sulphonyloxy groups, e.g. p-toluenesulphonyloxy or methylsulphonyloxy.

The amino substituents of the N-azacycloaliphatic residue are primary, secondary or tertiary amino groups, such as amino, lower alkylamino, e.g. methylamino or ethylamino, di-lower alkylamino, e.g. dimethylamino or diethylamino, or especially alkyleneamino, preferably having 4–8 ring members, e.g. pyrrolidino or piperidino, azaalkyleneamino, preferably having 6–8 ring members, such as a piperazino group, e.g. 4-methyl-piperazino, or oxaalkyleneamino, preferably having 6 ring members, e.g. morpholino.

The N-azacycloaliphatic residue —N=Z primarily represents one of the residues of formulae

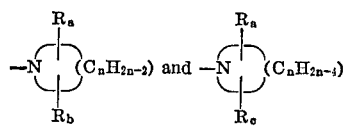

in which $n$ denotes 5–7, $R_a$ represents a hydrogen atom or an optionally substituted hydrocarbon residue, particularly an optionally substituted aromatic hydrocarbon residue, as well as an optionally substituted heterocyclic residue of aromatic character, $R_b$ (in the saturated grouping) represents a hydrogen atom or a free or preferably functionally modified carboxyl group, as well as an acyl group, a free or functionally converted hydroxyl or a free or substituted amino group, and $R_c$ (in the unsaturated grouping having one carbon-to-carbon double bond in the ring) denotes hydrogen, or $R_a$ and $R_b$, as well as $R_a$ and $R_c$ together denote a lower alkylene group.

A 4-pyrazolyl residue may be unsubstituted in the 1-position, but preferably contains a substituent in this position, primarily an optionally substituted hydrocarbon residue, a heterocyclic residue of aromatic character or an acyl residue. The hydrocarbon residues and heterocyclic residues are primarily the above-mentioned residues which substitute the N-azacycloaliphatic grouping

such as optionally substituted aliphatic hydrocarbon residues, for example, lower alkyl, lower alkenyl or lower alkinyl, optionally substituted cycloaliphatic hydrocarbon residues, for example, cycloalkyl, optionally substituted cycloaliphatic-aliphatic hydrocarbon residues, for example, cycloalkyl-lower alkyl, optionally substituted aromatic hydrocarbon residues, especially monocyclic or bicyclic aromatic residues, or optionally substituted araliphatic, especially monocyclic or bicyclic araliphatic hydrocarbon residues. Heterocyclic residues are primarily monocyclic or bicyclic heterocyclic residues having aromatic properties, bicyclic heterocyclic residues preferably being benzoazacyclic residues of aromatic character in which the azacyclic ring contains 5–6 ring members and up to 3 nitrogen atoms or 1 or 2 nitrogen atoms together with 1 oxygen or 1 sulphur atom as ring members, primarily quinolyl, e.g. 2-, 3-, 4- or 8-quinolyl, isoquinolyl, e.g. 1-isoquinolyl, cinnolinyl, e.g. 3- or 4-cinnolinyl, quinazolinyl, e.g. 2- or 4-quinazolinyl, quinoxalinyl, e.g. 2-quinoxalinyl, phthalazinyl, e.g. 1-phthalazinyl, benzotriazinyl, e.g. 1,2,3- or 1,2,4-benzotriazinyl, benzothiadiazinyl, e.g. 1,1-dioxo-2H-1,2,3-benzothiadiazin-4-yl, benzimidazolyl, e.g. 1-lower alkyl-2-benzimidazolyl, benzoxazolyl, e.g. 2-benzoxazolyl, benzisoxazolyl, e.g. 3-benzisoxazolyl, benzothiazolyl, e.g. 2-benzothiazolyl, or benzisothiazolyl, e.g. 3-benzisothiazolyl groups. These residues may optionally contain the above-mentioned substituents, the bicyclic heterocyclic residues of aromatic character may be substituted, for example, in the same manner as the above-mentioned aromatic residues substituting the N-azacycloaliphatic residue.

An acyl group substituting the 1-position of the 4-pyrazolyl residue is primarily the acyl residue of an organic carboxylic acid, especially of a functionally modified carbonic acid which is, for example, represented by a functionally modified carboxyl group, preferably the acyl residue of a monoester of carbonic acid, which is, for example, represented by a carbo-lower alkoxy group, or the acyl residue of a carbonic acid monoamide, which is, for example, represented by an optionally N-substituted carbamyl group, as well as the acyl residue of an aliphatic carboxylic acid, especially a lower alkanecarboxylic acid, as well as of a cycloaliphatic, aromatic or araliphatic carboxylic acid, or of a heterocyclic carboxylic acid of aromatic character, such as, for example, the acyl residues referred to above, which may optionally be substituted, for example, as the hydrocarbon residues substituting the N-azacycloaliphatic residue.

The new compound may furthermore contain other substituents in the pyrazole ring, especially lower alkyl, phenyl or pyridyl groups, these groups being optionally substituted as referred to above. The pyrazole nucleus preferably contains in 5-position a lower alkyl group, for example, one of the above-mentioned residues, especially a methyl group, which may optionally be substituted by an etherified hydroxy group, such as lower alkoxy, e.g. methoxy or ethoxy.

A hydroxyl group X is advantageously a free hydroxyl group; it may, however also be substituted and may, for example, represent a functionally converted, particularly an etherified hydroxyl group, such as a hydroxyl group substituted by a lower aliphatic hydrocarbon residue, for example, a lower alkyl or lower alkenyl group having preferably up to 7 carbon atoms, e.g. methyl, ethyl, propyl, isopropyl or allyl. Substituted hydroxy may also be an esterified hydroxyl group, for example, esterified by an amide, N-lower alkylamide or an N,N-di-lower alkylamide or a lower alkyl ester of carbonic acid or by a lower alkanecarboxylic acid, such as, for example, one of the above-mentioned acids.

The residue Alk is a 1,1-lower alkylidene radical, for example, a 1,1-ethylidene radical or a 1,1-propylidene radical, but above all a methylene radical.

The group R primarily represents a hydrogen atom, but may also represent lower alkyl, preferably having up to 7 carbon atoms, e.g. methyl, ethyl, propyl, isopropyl or tert.butyl.

The new compounds exhibit valuable pharmacological properties. Apart from psychotropic effects, they primarily show antihypertensive properties, which are demonstrable in test animals, such as cats, dogs or rats. Furthermore, the compounds show central nervous system depressant, e.g. tranquillizing, sedative and anticonvulsive properties, as well as antitussive, anti-inflammatory, adrenolytic or barbiturate-potentiating effects. The new compounds are, therefore, useful as pharmacologically effective compounds, primarily as anti-hypertensive compounds. Thus, on the basis of animal tests, it has been found, that the compounds show anti-hypertensive effects at a dosage of about 0.00025 g./kg. to about 0.01 g./kg. (in rats, when given orally or intravenously). On the basis of other animal tests, compounds of the present invention shown antitussive properties in cats at doses of about 0.002 g./kg. to about 0.01 g./kg. (intravenous application), and anti-inflammatory effects in rats at doses of about 0.03 g./kg. to about 0.1 g./kg. (oral application). They are also useful as intermediates in the preparation of other valuable compounds, especially of pharmacologically active substances.

Compounds having particularly valuable pharmacological, especially antihypertensive properties are those of formulae

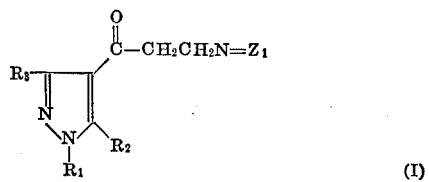

and

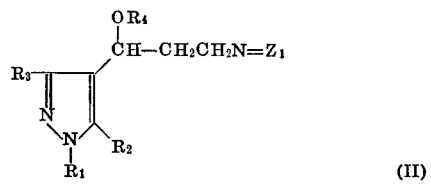

$R_1$ denotes a lower alkyl residue, optionally substituted by a free or functionally converted, particularly reactive esterified hydroxy or free or substituted amino, a phenyl residue, optionally substituted by 1, 2 or more halogeno, trifluoromethyl, lower alkyl, lower alkoxy, amino and/or nitro, a phenyl-lower alkyl residue optionally substituted like the phenyl residue, a pyridyl residue optionally substituted as the phenyl residue, a bicyclic benzoazacyclic residue of aromatic character, optionally substituted like the phenyl residue, in which the azacyclic ring contains 5–6 ring members and up to 2 nitrogen atoms or a nitrogen atom together with an oxygen atom or a sulfur atom as ring members, or the acyl residue of a mono- functionally modified, particularly mono-esterified carbonic acid, or a lower alkanecarboxylic acid, $R_2$ denotes lower alkyl, as well as lower alkoxy-lower alkyl, $R_3$ denotes a hydrogen atom or lower alkyl, $R_4$ stands for a hydrogen atom or lower alkyl, and the residue —N=$Z_1$ denotes the saturated group of the formula

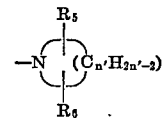

or the unsaturated group of the formula

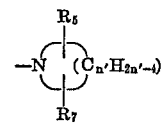

which contains a carbon-carbon double bond in the ring, in which formulae $n'$ denotes 5 or 6, $R_5$ represents hydrogen or phenyl optionally substituted like the phenyl residue $R_1$, $R_6$ denotes hydrogen, a functionally modified carboxyl group, a free, esterified or etherified hydroxyl group, or a di-lower alkylamino, a 5–8 ring-membered alkylenamino, a morpholino or a 4-lower alkyl-piperazino group, and $R_7$ represents hydrogen atom, or $R_5$ and $R_6$, as well as $R_5$ and $R_7$, when taken together, denote a lower alkylene group.

In the compounds of Formulae I and II, $R_1$ preferably denotes a free or functionally converted, particularly reactive esterified $\beta$- or $\gamma$-hydroxy-lower alkyl group, a $\beta$- or $\gamma$-amino-lower alkyl group, wherein the amino group may be unsubstituted or substituted by one or two lower alkyl groups or by a lower alkylene residue having 4–7 carbon atoms optionally interrupted by an oxygen or sulphur atom or by an optionally substituted, for example, lower alkyl-substituted nitrogen atom group, a phenyl residue which may optionally contain 1, 2 or more fluorine, chlorine or bromine atoms, methyl, methoxy, trifluoromethyl, amino and/or nitro groups, a phenyl-lower alkyl group which may optionally be substituted in the phenyl nucleus like the phenyl residue, a pyridyl group which may optionally be substituted like the phenyl residue, a bicyclic benzoazacyclic group of aromatic character, which may optionally be substituted like the phenyl residue and in which the azacyclic ring contains 5 ring members and 1 nitrogen atom together with an oxygen atom or a sulphur atom as ring members, or 6 ring members and up to 2 nitrogen atoms as ring members, or a carbo-lower alkoxy or a lower alkanoyl group, $R_2$ denotes a methyl, as well as a methoxymethyl group, $R_3$ is hydrogen, and $R_4$ stands for hydrogen or lower alkyl, e.g. methyl or ethyl, and wherein the residue —N=$Z_1$ denotes the group of formula

or the group of formula

in which $R_5'$ denotes a phenyl group optionally substituted like the phenyl residue $R_1$, and $R_6'$ stands for hydrogen, cyano, carbo-lower alkoxy, lower alkoxy or lower alkanoyloxy, with the groups $R_5'$ and $R_6'$ in the piperidino residue preferably substituting the same carbon atom, primarily the 4-position, and with the group $R_5'$ in the 1,2,5,6-tetrahydro-pyridyl group preferably occupying the 4-position.

Especially valuable pharmacological particularly antihypertensive properties are shown by compounds of formulae

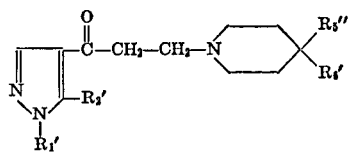

(Ia)

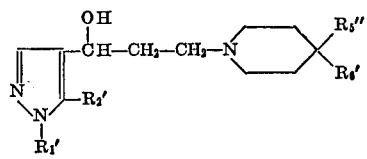

(IIa)

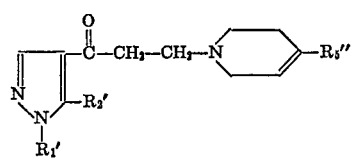

(Ib)

and

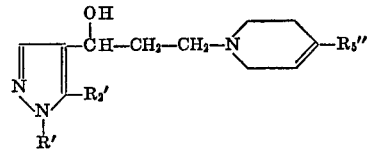

(IIb)

in which $R_1'$ represents β-hydroxyethyl or β-halogenoethyl, e.g. a β-chloroethyl, or a β-sulfonyloxyethyl group, such as a β-phenylsulfonyloxyethyl group optionally substituted in the phenyl portion by one, two or more halogeno, lower alkyl, lower alkoxy, trifluoromethyl, amino or nitro, e.g. β-phenyl sulfonyloxyethyl, β-4-methylphenylsulfonyloxyethyl or β-4-bromophenylsulfonyloxyethyl, as well as β-4-chlorophenyl-sulfonyloxyethyl, or a β- or γ-amino-lower alkyl group, wherein the amino group is unsubstituted or mono- or disubstituted by lower alkyl or lower alkylene, the latter having 4–6 chain carbon atoms which may optionally be interrupted by any oxygen atom or an optionally N-lower alkyl substituted nitrogen atom, such as β-aminoethyl, β-N,N-di-lower alkyl-aminoethyl, a β - N,N-alkyleneaminoethyl, in which alkylene has 4–6 chain carbon atoms, β-morpholino-ethyl, β-piperazinyl ethyl or β-4-lower alkyl-piperazinyl-ethyl, phenyl optionally substituted as shown above, phenyl-lower alkyl, e.g. benzyl or phenylethyl optionally substituted in the phenyl nucleus like the above phenyl residue, a pyridyl, benzothiazolyl, quinolinyl, isoquinolinyl, cinnolinyl, quinazolinyl, phthalazinyl or quinoxalinyl residue optionally substituted like the above phenyl residue, or carbo-lower alkoxy, $R_2'$ stands for methyl, as well as methoxymethyl, $R_5''$ denotes phenyl optionally substituted like the phenyl residue $R_1'$, and $R_6'$ has the previously given meaning.

In the above-mentioned Formulae Ia, IIa, Ib and IIb $R_1'$ primarily denotes β-hydroxyethyl or, phenyl optionally substituted by one, two or more fluoro, chloro, bromo, methyl, trifluoromethyl, methoxy, amino and/or nitro groups, as well as benzyl or phenylethyl optionally substituted in the phenyl nucleus like the phenyl residue or pyridyl, optionally substituted as the phenyl nucleus, and also 2 - benzothiazolyl, 2-quinolinyl, 4-quinolinyl, 1-isoquinolinyl, 3 - cinnolinyl, 4-cinnolinyl, 2-quinazolinyl, 4-quinazolinyl, 1-phthalazinyl or 2-quinoxalinyl, these residues being optionally substituted as the phenyl residue, with 2 - quinoxalinyl and 3-methyl-2-quinoxalinyl being particularly preferred from amongst the bicyclic azacyclic substituents of aromatic character, or carbo-lower alkoxy, e.g. carbomethoxy or carbethoxy, $R_2'$ stands for methyl, as well as methoxymethyl, $R_5''$ denotes phenyl optionally substituted like the phenyl residue $R_1'$, and $R_6'$ denotes cyano, carbo-lower alkoxy, e.g. carbomethoxy, carboethoxy, lower alkanoyloxy, lower alkoxy or hydrogen.

Particularly pronounced pharamacological, especially antihypertensive, properties are shown by the 4-{3-[4-(4 - fluorophenyl) - 1,2,5,6-tetrahydro-1-pyridyl]-1-oxopropyl} - 1-(2-hydroxyethyl)-5-methyl-pyrazole, the 1-(3-fluorophenyl) - 4-{3-[4-(4-fluorophenyl)-1,2,5,6-tetrahydro-1-pyridyl]-1-oxopropyl}-5-methyl-pyrazole, and the 1-(2-hydroxyethyl)-5-methyl-4[3-(4-phenyl-1,2,5,6-tetrahydro-1-pyridyl)-1-oxo-propyl]-pyrazole, as well as the 1(2-hydroxyethyl) - 5-methyl-4-{3-[4-(3-trifluoromethyl-phenyl) - 1,2,5,6-tetrahydro-1-pyridyl]-1-oxo-propyl}-pyrazole and the 5-methoxymethyl-1-phenyl-4-[3-(4-phenyl-1,2,5,6-tetrahydro - 1 - pyridyl)-3-oxo-propyl]-pyrazole and the salts, such as the acid addition salts, particularly the non-toxic acid addition salts thereof, which, when given to experimental animals, such as rats, in doses of about 0.00025 g./kg. to about 0.01 g./kg. (intravenous or oral application), produce outstanding antihypertensive effects.

Antitussive properties are shown by 1-carbethoxy-4-[3-(4-carbethoxy-4-phenyl-piperidino)-1-oxo-propyl]-5-methylpyrazole and the 1-(2-fluorophenyl)-4-{3-[4-(4-fluorophenyl) - 1,2,5,6 - tetrahydro-1-pyridyl]-1-oxo-propyl}-5-methyl-pyrazole and their salts, such as the acid addition salts, particularly the non-toxic acid addition salts, which when given to experimental animals, such as cats at doses of about 0.002 g./kg. to about 0.01 g./kg. (intravenous application) produce significant antitiussive effects.

Anti-inflammatory effects are exhibited by the 1-(4-fluorophenyl)-4-{3-[4-(4-fluorophenyl) - 1,2,5,6 - tetrahydro-1-pyridyl]-1-oxo-propyl}-5-methyl-pyrazole and the 1-(2-fluorophenyl) - 4 - {3 - [4-(4-fluorophenyl)-1,2,5,6-tetrahydro-1-pyridyl]-1-oxo-propyl} - 5 - methyl-pyrazole and their salts, such as the acid addition salts, particularly the non-toxic acid addition salts, which when given to experimental animals, such as rats at doses of about 0.03 to about 0.1 g./kg. (oral application) produce significant anti-inflammatory activity.

The new compounds are obtained by methods which are in themselves known, for example, by (a) reacting a compound of formula Pyr—C(=O)—Alk—H with a lower alkanal and an azacycloaliphatic compound of formula H—N=Z or an amine compound having at least one hydrogen atom attached to the nitrogen and permitting the formation of an N-azacycloaliphatic residue of formula —N=Z, and forming the N-azacycloaliphatic group of the formula —N=Z in a resulting compound having a group permitting the formation of the N-azacycloaliphatic group of the formula —N=Z, or (b) reacting a compound of formula Pyr—C(=X)—Alk—CH(R)—Y or Pyr—C(=X)—Alk'=CH—(R), in which Y is an eliminable group, and Alk' denotes a 1,1,1-lower alkylidyne group, with the said azacycloaliphatic compound or amine compound and forming the N-azacycloaliphatic residue —N=Z in a resulting compound having a group permitting the formation of the N-azacycloaliphatic residue —N=Z, or (c) reductively replacing in a compound of the formula Pyr—C(=X)—Alk—CH(R)—N=Z, in which at least one of the methylene groups adjacent to the nitrogen atom of the azacycloaliphatic ring carries an oxo or thiono group, such group by two hydrogen atoms, or (d) reacting a compound of the formula (acyl-formylmethyl)—C(=X)—Alk—CH(R)—N=Z, in which "acyl" represents the residue of an organic carboxylic acid or an enol or enol derivative thereof with a compound of the formula $R_1$—NH—NH$_2$, or (e) reducing in a compound of the formula Pyr—C(=X)—Alk'=C(R)—N=Z the olefinic double bond, and if desired or required, reducing at any stage of the process an oxo group X into a hydroxyl group and/or substituting a hydroxyl group or oxidizing it to an oxo group, and/or, if desired, converting at any stage of the procedure an azacycloaliphatic residue into another azacycloaliphatic residue, and/or, if desired, in a resulting compound converting a substituent into another and/or eliminating a substituent and/or introducing a substituent, and/or, if desired, converting a resulting free base into a salt or a resulting salt into the free base or into another salt, and/or, if desired, resolving a mixture of isomers into its constituent isomers.

The reaction of a compound of formula $$Pyr-C(=O)-Alk-H$$

with a lower alkanal, especially with formaldehyde, and with the azacycloaliphatic compound H—N=Z or the amine compound is carried out in accordance with the Mannich reaction. Instead of the lower alkanal, it is also possible to use reagents capable of releasing the latter, such as functional derivatives, for example, acetals or acylates, or their polymerisation products, optionally with the addition of acid. Thus, for example, formaldehyde may be used in the form of paraformaldehyde or trioxymethylene. The azacycloaliphatic compound or the amino compound is preferably used in the form of a salt. The reaction preferably takes place in the presence of a diluent, e.g. an alcohol or dioxane, or a solvent mixture or an aqueous mixture; when polymerisation products of the aldehyde are used, it is advisable to work in an organic diluent, such as one of those mentioned above, or also in benzene, toluene, nitrobenzene or nitromethane. Usually, the reaction is carried out at elevated temperatures; one may also work in a closed vessel.

The reaction of the compound of the formula $$Pyr-C(=X)-Alk-CH(R)-Y,$$ in which the eliminable group Y is preferably a reactive esterified hydroxyl group, primarily a halogen atom or a sulphonyloxy group, such as benzenesulfonyloxy group, e.g. p-toluenesulfonyloxy, as well as a suitable carbonyloxy group, e.g. acetyloxy or ethoxycarbonyloxy, but may also be a N-unsubstituted or N-polysubstituted amino group (in which case the starting material is preferably used in the form of a salt), and X primarily denotes the oxo group, or of the corresponding unsaturated compound of the formula $$Pyr-C(=X)-Alk'=CH-R$$

which may be formed in situ from the above compounds of the formula Pyr—C(=X)—Alk—CH(R)—Y, with the azacycloaliphatic compound of formula H—N=Z or the amine compound is carried out in the usual manner; starting materials having a reactive esterified hydroxyl group are preferably reacted in the presence of an acid-binding material, such as a basic condensation agent.

As amine compounds permitting the formation of an N-azacycloaliphatic residue, one may use ammonia or above all primary amines, the substituents of which permit ring closure with the formation of the N-azacycloaliphatic residue. Such residues are, for example, aliphatic residues carrying a free or reactive esterified hydroxyl or an amino group.

The synthesis of the N-azacycloaliphatic residue takes place in the usual manner. Thus, a compound with a free amino group may be reacted with a reactive diester of an appropriate 4–7 membered aliphatic diol to furnish the azacycloaliphatic ring directly. It is however also possible, by starting with compounds having the free amino group, to carry out a substitution with reactive derivatives of 4–7-membered aliphatic diols or aminoalcohols, to obtain secondary amines, which carry at the amine group the substituents needed for the formation of the azacycloaliphatic ring. In resulting secondary amines, an aliphatic residue which contains, for example, a free or reactive esterified hydroxyl group or amino group, the hydroxyl group may, if desired, be first reactively esterified, for example, by means of halides of sulphur or phosphorus, especially thionyl chloride, or by means of organic sulphonyl halides, e.g. p-toluenesulphonyl chloride, and the ring closure to furnish the azacycloaliphatic ring may then be carried out, for example, by eliminating water or, preferably, an acid, as well as ammonia, where necessary, in the presence of a condensing reagent.

The reductive replacement of an oxo or thiono group by two hydrogen atoms follows the usual practice. A carbonyl group is converted into a methylene group, for example, by treating the starting material with a suitable light metal hydride, e.g. lithium aluminium hydride, if necessary, in the presence of an activator, such as aluminium chloride, or with hydrogen in the presence of a suitable catalyst, e.g. a copper-chromium catalyst, a thiocarbonyl group, for example, by treatment with a hydrogenating catalyst, e.g. Raney nickel, in the presence of a suitable solvent, e.g. an alkanol, and, if necessary, of hydrogen. During this reaction, simultaneously reducible substituents, for example, an oxo group X, may be reduced as well and, for instance, be converted into a hydroxyl group.

The reaction of a compound of formula $$R_1-NH-NH_2$$

as in modification (d) is preferably carried out with a suitable enol derivative, particularly a lower alkyl, e.g. methyl or ethyl enol ether, of a compound of the formula N—(acylformylmethyl)—C(=X)—Alk
—CH(R)—N=Z one may proceed stepwise, for example, a hydrazono intermediate may be formed which may then be ring closed, for example, by heating, into the desired product.

An olefinic bond in a starting material of the formula Pyr—C(=X)—Alk'=C(R)—N=Z may be saturated, for example, by catalytic hydrogenation, e.g. treatment with hydrogen in the presence of a noble metal catalyst, such as a palladium catalyst, if necessary, under pressure. Simultaneously, other reducible groups in the molecule, such as an oxo group, may be reduced.

The reduction of an oxo group X to a hydroxyl group is carried out in the usual manner. The group is preferably reduced by, for example, treatment with nascent hydrogen, such as with a metal in the presence of a hydrogen-releasing agent, for example, with sodium in an alcohol, or by treatment with a complex metal hydride, e.g. sodium borohydride, or with hydrogen in the presence of a hydrogenation catalyst, for example, a platinum, palladium, rhodium, nickel or copper catalyst, such as platinum oxide, palladium black, Raney nickel or copper chromate or rhodium on a carrier, such as aluminium oxide or charcoal. The reduction preferably takes place in the presence of diluents and/or solvents, under cooling, at normal temperature or while heating, in open vessels or in closed vessels under pressure. The reduction of the oxo group may also take place according to the Meerwein-Ponndorf-Verley method, for example, in the usual manner by treatment with a lower alkanol, such as isopropanol, in the presence of an appropriate alcoholate, e.g. aluminium isopropylate.

In resulting compounds having free hydroxyl groups, the latter may be substituted in the usual manner. Etherification may, for example, be carried out by treatment with a diazo-compound, such as a diazo-lower alkane, e.g. diazomethane or diazoethane, optionally in the presence of a suitable Lewis acid, e.g. fluoboric acid, aluminium chloride, boron trifluoride etherate or aluminium lower alkanolate. It is, however, also possible to form a metal salt and react the latter with a reactive ester of an alcohol, or the hydroxyl group may be reactively esterified, for example, by replacing it by a halogen atom or converting it to an organic sulphonyloxy group, and can then be reacted with an alcohol, preferably in the form of a metal compound. The esterification preferably takes place by treatment with acid halides, acid anhydrides or ketenes, isocyanates or isothiocyanates, where appropriate in the presence of a condensing agent, such as a base capable of combining with acids.

If desired, a hydroxyl group may be converted into an oxo group X in known manner with a suitable oxidation reagent, such as, for example, a chromium-VI-compound.

The conversion of one N-azacycloaliphatic residue to another may take place by methods which are in themselves known. Thus, it is, for example, possible to eliminate, for example, in the form of water or an acid, from a saturated N-azacycloaliphatic residue a removable residue, such as a free or esterified hydroxyl group, e.g. a halogen atom or a sulphonyloxy group, together with a hydrogen atom, and thus to introduce a carbon-carbon double bond into the N-azacycloaliphatic ring. The elimination of water or acids may be, for example, carried out with warming and/or in the presence of suitable reagents, such as acids, e.g. p-toluenesulphonic acid, or of bases, for example, sodium hydroxide.

In N-azacycloaliphatic residues having a carbon-carbon double bond, the latter may be saturated by reduction, for example, by treatment with catalytically activated hydrogen.

Furhermore, substituents in resulting compounds may be converted into other substituents. Thus, the conversion of a hydroxyl group present in the substituent attached to the 1-position of the pyrazole nucleus to an esterified hydroxy group is carried out in a known manner, for example, as described before. Reactive esterified hydroxyl groups are converted to amino groupings by reaction with the appropriate amino compounds, either directly or in the presence of a suitable diluent, if necessary, while heating.

Free carboxyl groups may be converted in a manner which is in itself known into functionally converted carboxyl groups, for example, by esterification (e.g. treatment with a diazo compound or with an alcohol in presence of a suitable esterification reagent, such as dicyclohexylcarbodiimide, or conversion of the carboxyl group to a halogenocarbonyl group and reaction with an alcohol or a metal compound thereof), or by amidation (e.g. by treatment with ammonia or an amine in the presence of a suitable condensation reagent, such as dicyclohexylcarbodiimide, or by conversion of the carboxyl group to the halogenocarbonyl group and reaction thereof with ammonia or an amine).

Functionally modified carboxyl groups, such as esterified or amidated carboxyl groups, as well as cyano groups, may, for example, be converted to the free carboxyl group by saponification with acid or basic reagents, or may, for example, be converted to esterified carboxyl groups by alcoholysis; these reactions are carried out in a manner which is in itself known.

Furthermore, nitro groups may subsequently be reduced in the usual manner, for example, by treatment with catalytically activated hydrogen, or nascent hydrogen; this reduction may take place simultaneously with a reduction of an oxo group X to the hydroxyl group.

Substituents may be eliminated in a manner which is in itself known; free carboxyl groups may, for example, be eliminated by decarboxylation at elevated temperatures, and α-phenylalkyl groups, e.g. benzyl groups, which substitute a nitrogen or oxygen atom may, for example, be eliminated by hydrogenolysis in the presence of a suitable hydrogen catalyst.

Substituents may be introduced into resulting compounds according to per se known methods. Thus, for example, the hydrogen atom of a pyrazole nucleus unsubstituted in 1-position, may be replaced by a substituent, for example, by treatment with a compound containing a reactive esterified hydroxyl groups, such as an aliphatic halogen compound or an acid halide, or with an aryne or diazonium compound, if necessary, after the formation of a derivative, such as a metal, preferably an alkali metal, e.g. sodium, compound, or in the presence of a condensation agent.

The above reactions are carried out in the usual manner, while cooling, at normal temperature, or while heating, in an open or closed vessel, if necessary, under pressure, in the presence or absence of diluents and/or catalysts and/or condensation agents, and/or in an inert gas atmosphere.

Depending on the reaction conditions the new compounds are obtained in free form or in the form of their salts.

The salts of compounds of the present invention are acid addition salts, for example, non-toxic, pharmaceutically useful acid addition salts, primarily those of inorganic acids, e.g. hydrochloric, hydrobromic, nitric, sulfuric or phosphoric acid, as well as of organic acids, such as organic carboxylic acids, e.g. acetic, propionic, glycollic, malonic, succinic, maleic, hydroxymaleic, fumaric, malic, tartaric, citric, benzoic, cinnamic, mandelic, salicylic, 4-aminosilicylic, 2 - phenoxy-benzoic, 2 - acetoxybenzoic, embonic, nicotinic or isonicotinic acid, or of organic sulfonic acids, e.g. methanesulphonic, ethanesulphonic, 2-hydroxyethanesulphonic, ethane-1,2-disulphonic, benzenesulphonic, p-toluenesulphonic, naphthalene-2-sulphonic or cyclohexylsufamic acid. Salts of such acids, as well as other acid addition salts, may furthermore be used as intermediate products, for example, for purifying the free compounds, or for the preparation of other salts, as well as for identification purposes. Salts which are especially suited for identification purposes are, for example, those of picric, picrolonic, flavianic, phosphotungstic, phosphomolybdic, chloroplatinic, Reinecke or perchloric acid.

The resulting salts may be converted to the free bases in a manner which is in itself known, for example, by treatment with a base such as a metal hydroxide, e.g. lithium hydroxide, sodium hydroxide, potasisum hydroxide or calcium hydroxide, a metal carbonate, e.g. sodium, potassium or calcium carbonate or hydrogen carbonate, or with ammonia or a suitable hydroxyl ion exchanger.

The resulting salts may be converted to other salts in a manner which is in itself known, for example, by treating a salt of an inorganic acid with a suitable metal salt, e.g. sodium, barium or silver salt of an acid, in a suitable solvent in which the resulting inorganic salt is insoluble and is, therefore, removed from the reaction medium, or by treatment with an ion exchanger.

The resulting free bases may be converted to their acid addition salts in a manner which is in itself known, for example, by treating the solution of a base in a suitable inert solvent or solvent mixture with an acid, such as one of the above mentioned ones, or with a solution thereof, or with a suitable anion exchanger. The salts may also be obtained in form of their hydrates or may include the solvent used for crystallisation. Because of the close relationship between the new compounds in free form and in the form of their salts, the free compounds or the salts are in the present context, also to be understood as the corresponding salts and free compounds, respectively, where ever such is appropriate and feasible.

Resulting isomer mixtures which may be separated into the individual isomers in a manner which is in itself known. Racemates may be resolved into the optically active d- and l-forms, for example, by crystallisation from optically active solvents or by treatment of the racemic compound, preferably in the presence of a suitable solvent, with one of the optically active forms of an acid having asymmetric carbon atoms, and isolation of the diastereoisomeric salts.

The invention also relates to those modifications of the method, according to which one starts from the compound obtainable as an intermediate at any stage of the procedure and carries out the remaining process stages, or interrupts the procedure, or in which a starting material is formed under the reaction conditions or used in the form of a derivative, e.g. a salt thereof.

In the method of the present invention one preferably uses such starting materials as lead to the compounds which were initially described as being particularly valuable.

The starting substances used in this invention are known or may be obtained by known methods. Thus, compounds of the formula Pyr—C(=O)—Alk—H are obtained, for example, by treating suitably substituted α,γ-diketones, such as β-hydroxymethylene-α,γ-dione compounds or derivatives thereof, e.g. ethoxymethylene-acetylacetone, with hydrazines and ring closing the resulting hydrazones, for example, by heating. In the starting materials so produced it is, for example, possible to introduce a hydroxymethyl group into the side-chain by treatment with formaldehyde, and either to eliminate a hydroxyl group from a resulting compound together with a hydrogen atom or to convert it to a removable group, such as a reactive esterified group or to convert it to an amino group according to the previously described procedure. Azacycloaliphatic starting materials which contain a carbonyl or thiocarbonyl group adjacent to the aza nitrogen atom may be obtained by appropriate intramolecular or intermolecular acylation reactions; in the compounds so obtainable a carbonyl group may be converted to a thiocarbonyl group, for example, by treatment with phosphorous pentasulphide. Starting materials of the formula

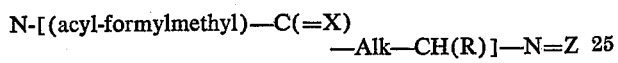

may be obtained, for example, by treatment of a compound of the formula

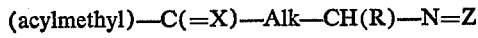

with a suitable derivative of formic acid or orthoformic acid, such as a lower alkyl ester, and, if necessary, converted into a suitable enol derivative according to known methods. A compound of the formula

may be obtained, for example, by treatment of a compound of the formula Pyr—C(=X)—Alk—C(=O)—R with a compound of the formula H—N=Z, preferably in the presence of an acidic reagent, e.g. p-toluenesulphonic acid, with the formation of the desired enamine, or from a compound of the formula Pyr—C(=X)—Alk—C≡N by treatment with a compound of the formula H—N=Z under reductive conditions, for example, while treating with hydrogen in the presence of Raney nickel.

The compounds of the present invention are useful as medicaments, for example, in the form of pharmaceutical preparations which contain these compounds together with pharmaceutical organic or inorganic, solid or liquid carriers which are suitable for enteral, for example, oral, or parenteral administration. These preparations may in solid form, e.g. as tablets, dragées, capsules or suppositories, or in the liquid form e.g. as solutions, suspensions or emulsions. They may optionally contain auxiliary substances, such as preservatives, stabilisers, wetting agents or emulsifiers, solubilizers, salts for regulating the osmotic pressure, buffers, dyestuffs or flavouring substances. They may also contain other therapeutically valuable substances and are formulated by methods which are in themselves known.

The invention is described in more detail in the following examples. The temperatures are given in degrees centigrade.

EXAMPLE 1

A mixture of 4 g. of 4-acetyl-5-methyl-1-phenyl-pyrazole and 3.2 g. of paraformaldehyde in 65 ml. of ethanol is treated with 4.25 g. of 4-cyano-4-phenyl-piperidine hydrochloride and 4 drops of concentrated hydrochloric acid, and boiled under reflux for 24 hours. On cooling one obtains the crystalline 4-[3-(4-cyano-4-phenyl-piperidino)-1-oxo-propyl]-5-methyl-1-phenyl-pyrazole hydrochloride of formula

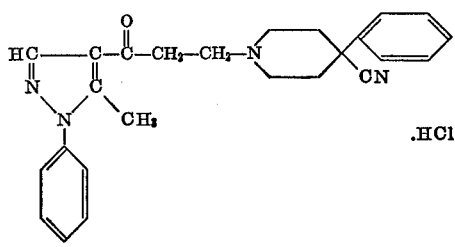

which melts at 214° (with decomposition) after recrystallisation from isopropanol. The free 4-[3-(4-cyano-4-phenyl-piperidino) - 1 - oxo-propyl]-5-methyl-1-phenyl-pyrazole is obtained by treatment with 1 N aqueous caustic soda.

EXAMPLE 2

A mixture of 5.6 g. of 4-acetyl-1-(4-bromophenyl)-5-methyl-pyrazole and 3.2 g. of paraformaldehyde in 75 ml. of ethanol is treated with 5.1 g. of 4-phenyl-4-n-propyloxy-piperidine hydrochloride and 4 drops of concentrated hydrochloric acid and boiled under reflux for 24 hours. On cooling, 1-(4-bromophenyl)-5-methyl-4-[1-oxo-3-(4-phenyl-4-n-propyloxy-piperidino)-propyl]-pyrazole hydrochloride of formula

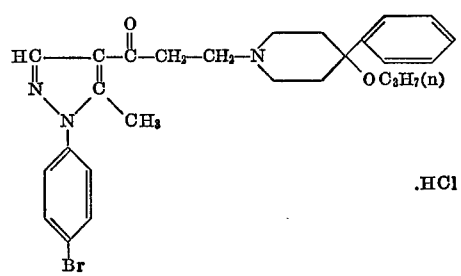

crystallises out. This melts at 240° (with decomposition) after recrystallisation from methanol. Its free base may for example be obtained by treatment with 1 N aqueous caustic soda.

1 - (4 - fluorophenyl)-5-methyl-4-[1-oxo-3-(4-phenyl-4-n-propyloxy-piperidino)-propyl]-pyrazole is prepared in a similar manner; its monohydrochloride melts at 230° (with decomposition) after recrystallisation from a mixture of isopropanol and ether.

EXAMPLE 3

A mixture of 5.6 g. of 4-acetyl-1-(5-bromo-2-pyridiyl)-5-methyl-pyrazole and 3.2 g. of paraformaldehyde in 170 ml. of ethanol is treated with 5.1 g. of 4-phenyl-4-n-propyloxy-piperidine hydrochloride and a small amount of concentrated hydrochloric acid and is boiled under reflux for 24 hours. On concentration under reduced pressure to one-third of its volume and cooling at 0°, 1-(5-bromo - 2 - pyridyl)-5-methyl-4-[1-oxo-3-(4-phenyl-4-n-propyloxy-piperidino)-propyl] - pyrazole hydrochloride monohydrate of formula

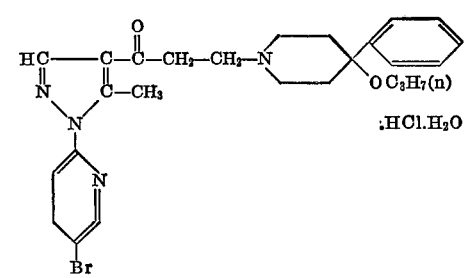

is obtained in crystalline form; after recrystallisation from methanol it melts at 180° (with decomposition). The freebase is obtained by treatment with a suitable alkaline reagent, for example 1 N aqueous sodium hydroxide.

EXAMPLE 4

A mixture of 4.36 g. of 4-acetyl-1-(4-fluorophenyl)-5-methyl-pyrazole and 3.2 g. of paraformaldehyde in 70 ml. of ethanol is treated with 3.92 g. of 4-phenyl-1,2,5,6-tetrahydropyridine hydrochloride and 4 drops of concentrated hydrochloric acid and boiled under reflux for 24 hours. On cooling, the crystalline 1-(4-fluorophenyl)-5 - methyl-4-[1-oxo-3-(4-phenyl-1,2,5,6-tetrahydro-1-pyridyl)-propyl]-pyrazole hydrochloride of formula

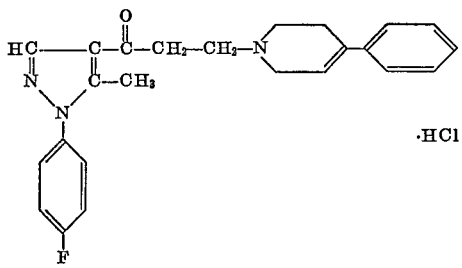

is obtained and melts, after recrystallisation from isopropanol, at 192° (with decomposition). The free compound is obtained by treating the hydrochloride with a suitable alkaline reagent, for example 1 N aqueous sodium hydroxide.

EXAMPLE 5

A mixture of 4 g. of 4-acetyl-1-phenyl-5-methyl-pyrazole and 3.2 g. of paraformaldehyde in 60 ml. of ethanol is treated with 3.92 g. of 4-phenyl-1,2,5,6-tetrahydro-pyridine hydrochloride and 4 drops of concentrated sulphuric acid and boiled under reflux for 24 hours. The 5 - methyl-4-[1-oxo-3-(4-phenyl-1,2,5,6-tetrahydro-1-pyridyl)-propyl]-1-phenyl-pyrazole hydrochloride hemihydrate of formula

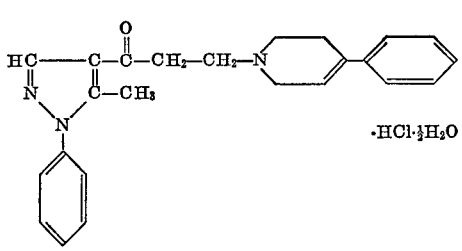

crystallises on cooling; after recrystallisation from a mixture of methanol, ethyl acetate and ether, it melts at 195° (with decomposition). The free compound is obtained by treatment with a suitable alkaline reagent, such as 1 N aqueous sodium hydroxide.

The following compounds may be obtained by the above method and by choosing the appropriate starting materials:

1-(4-bromophenyl)-5-methyl-4-[1-oxo-3-(4-phenyl - 1, 2,5,6-tetrahydro-1-pyridyl)-propyl]-pyrazole, the monohydrochloride of which melts at 205° (with decomposition) after recrystallisation from methanol; and 1-(4-methyl-phenyl)-5-methyl-4-[1-oxo-3-(4-phenyl - 1, 2,5,6-tetrahydro-1-pyridyl)-propyl]-pyrazole, the monohydrochloride of which melts at 205° (with decomposition) after recrystallisation from a mixture of methanol, ethyl acetate and ether.

A mixture of 5.4 g. of 4-acetyl-1-(2,5-dichlorophenyl)-5-methyl-pyrazole and 3.2 g. of paraformaldehyde in 65 ml. of absolute ethanol is treated wih 3.92 g. of 4-phenyl-1,2,5,6-tetrahydro-pyridine-hydrochloride and 4 drops of concentrated hydrochloric acid. The reaction mixture is refluxed for 16 hours; on cooling nad diluting with ether, the monohydrochloride of 1-(2,5-dichlorophenyl)-5-methyl-4-[1-oxo-3-(4 - phenyl - 1,2,5,6 - tetrahydro - 1-pyridyl)-propyl]-pyrazole is obtained, which melts at 175° after recrystallization from methanol.

EXAMPLE 6

A mixture of 5.6 g. of 4-acetyl-1-(5-bromo-2-pyridyl)-5-methyl-pyrazole and 3.2 g. of paraformaldehyde in 70 ml. of ethanol is treated 3.92 g. of 4-phenyl-1,2,5,6-tetrahydropyridine hydrochloride and 1.5 ml. of concentrated hydrochloric acid and boiled under reflux for 24 hours. The 1-(5-bromo-2-pyridyl)-5-methyl-4-[1-oxo - 3 - (4-phenyl-1,2,5,6-tetrahydro-1-pyridyl)-propyl]-pyrazole dihydrochloride of formula

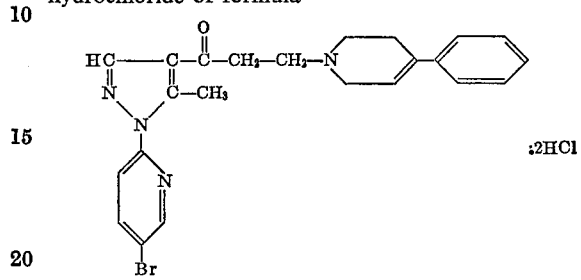

crystallises on cooling; it melts at 225° (with decomposition) after recrystallisation from ethanol. The salt is converted to the free compound by treatment with a suitable base, for example 1 N aqueous sodium hydroxide.

EXAMPLE 7

A mixture of 10 g. of 4-acetyl-1-phenyl-5-methyl-pyrazole and 4.5 g. of paraformaldehyde in 125 ml. of ethanol is treated with 11.2 g. of 4-(4-chlorophenyl)-1,2,5,6-tetrahydropyridine hydrochloride and 10 drops of concentrated hydrochloric acid and boiled under reflux for 24 hours. On cooling, the crystalline 4-{3-[4-(4-chlorophenyl)-1,2,5,6-tetrahydro-1-pyridyl]-1-oxo-propyl}-5-methyl - 1 - phenyl-pyrazole hydrochloride of formula

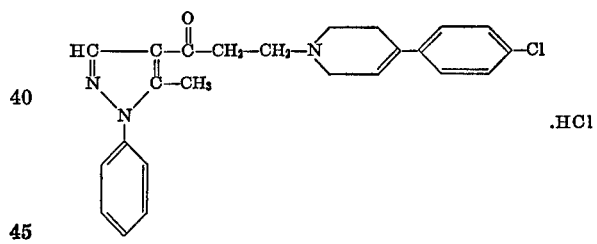

is obtained, which melts at 215° (with decomposition) after recrystallisation from methanol. The free base is obtained by treating the hydrochloride with a base, for example, 1 N aqueous sodium hydroxide.

The 1-(4-bromophenyl)-4-{3-[4-(4-chlorophenyl)-1,2, 5,6-tetrahydro-1-pyridyl]-1-oxo-propyl}-5-methyl - pyrazole is obtained in a similar way; its hydrochloride melts at 213–215° (with decomposition) after recrystallisation from methanol.

EXAMPLE 8

A mixture of 56 g. of 4-acetyl-1-(4-bromophenyl)-5-methyl-pyrazole and 18 g. of paraformaldehyde in 500 ml. of absolute ethanol is treated with 24.4 g. of piperidine hydrochloride and 2 ml. of concentrated hydrochloric acid and boiled under reflux for 24 hours. The 1-(4-bromophenyl)-5-methyl-4-(1-oxo-3-piperidino-propyl) - pyrazole hydrochloride of formula

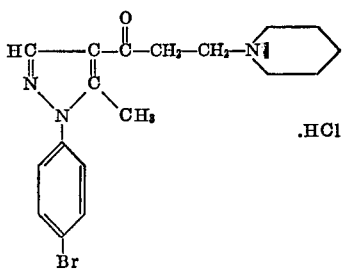

crystallises on cooling and, after recrystallisation from a mixture of methanol and ether, melts at 205–207° (with decomposition). The free base is obtained by treatment of the salt with a suitable alkaline reagent, for example, 1 N aqueous sodium hydroxide.

EXAMPLE 9

A mixture of 9.8 g. of 4-acetyl-1-carbethoxy-5-methyl-pyrazole and 4.5 g. of paraformaldehyde in 125 ml. of ethanol is treated with 9.5 g. of 4-phenyl-1,2,5,6-tetrahydropyridine hydrochloride and 10 drops of concentrated hydrochloric acid and boiled under reflux for 24 hours. On cooling, one obtains the crystalline 1-carbethoxy-5-methyl-4-(1-oxo-3-(4-phenyl - 1,2,5,6 - tetrahydro - 1-pyridyl)-propyl]-pyrazole hydrochloride of formula

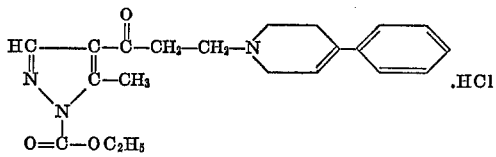

which melts at 205° (with decomposition) after recrystallisation from ethanol. It is converted to the free compound by treatment with an alkaline reagent, for example, 1 N aqueous sodium hydroxide.

EXAMPLE 10

A mixture of 3.9 g. of 4-acetyl-1-carbethoxy-5-methyl-pyrazole and 1.8 g. of paraformaldehyde in 60 ml. of ethanol is treated with 4.5 g. of 4-(4-chlorophenyl)-1,2,5,6-tetrahydropyridine and 4 drops of concentrated hydrochloric acid and boiled under reflux for 24 hours. The 1-carbethoxy-4-{3-[4-(4-chlorophenyl)-1,2,5,6 - tetrahydro-1-pyridyl]-1-oxo-propyl}-5-methyl-pyrazole hydrochloride of formula

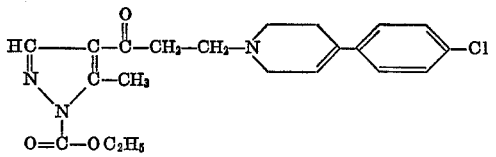

crystallises on cooling, and, after recrystallisation from methanol, melts at 210–212° (with decomposition). The free base is obtained by treating the hydrochloride salt with a suitable alkaline reagent, such as 1 N aqueous sodium hydroxide.

EXAMPLE 11

A mixture of 5.6 g. of 4-acetyl-1-(4-bromophenyl)-5-methyl-pyrazole and 1.8 g. of paraformaldehyde in 60 ml. of ethanol is treated with 4.1 g. of 4-phenyl-piperidine hydrochloride and 6 drops of concentrated hydrochloric acid and boiled under reflux for 24 hours. On cooling, one obtains the crystalline 1-(4-bromophenyl)-5-methyl-4-[1-oxo-3-(4-phenyl-piperidino)-propyl]-pyrazole hydrochloride of formula

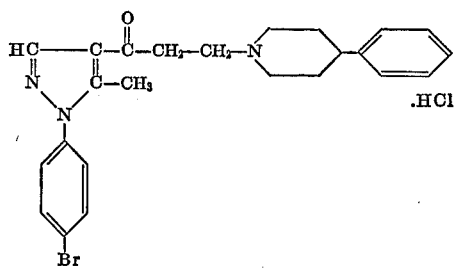

which after recrystallisation from a mixture of methanol and isopropanol melts at 212–213° (with decomposition). The free base is obtained by treating the hydrochloride salt with a suitable alkaline reagent, for example 1 N aqueous sodium hydroxide.

The following compounds are obtained in a similar manner, choosing appropriate starting substances: 1-(4-bromophenyl) - 4 - {3-[4-(4-chlorophenyl)-piperidino]-1-oxopropyl}-5-methyl-pyrazole, the monohydrochloride of which melts at 225–227° (with decomposition) after recrystallisation from a mixture of methanol and isopropanol; and 4-[3-(4-phenyl-piperidino)-1-oxo-propyl]-5-methyl-1-phenyl-pyrazole, the monohydrochloride of which melts at 196° (with decomposition) after recrystallisation from a mixture of methanol and isopropanol.

EXAMPLE 12

A mixture of 5.12 g. of 4-acetyl-1-(1-methyl-4-piperidyl)-5-methyl-pyrazole monohydrochloride and 1.8 g. of paraformaldehyde in 60 ml. of ethanol is treated with 3.92 g. of 4-phenyl-1,2,5,6-tetrahydro-pyridine hydrochloride and 4 drops of concentrated hydrochloric acid and boiled under reflux for 24 hours. On cooling, one obtains the crystalline 1-(1-methyl-4-piperidyl)-5-methyl - 4 - [1-oxo-3-(4-phenyl-1,2,5,6-tetrahydro - 1 - pyridyl)-propyl]-pyrazole dihydrochloride of formula

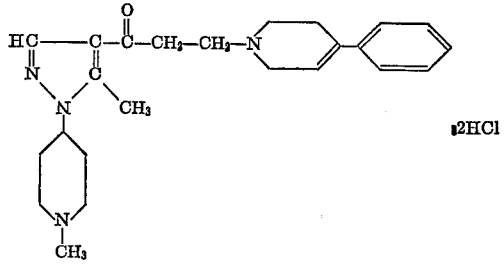

which, after recrystallisation from a mixture of methanol and isopropanol, melts at 275° (with decomposition). The free compound is obtained by treating the salt with a suitable base, for example, 2 N aqueous sodium hydroxide solution.

The starting material used in the above reaction is obtained as follows:

A solution of 16.2 g. of ethoxymethylene-acetyl-acetone in 50 ml. of dioxane is cooled to 0° and treated dropwise with a solution of 13.2 g. of 1-methyl-4-hydrazino-piperidine in 100 ml. of dioxane. The addition of the reagent is complete after 25 minutes, and the reaction mixture is stirred for 18 hours at room temperature. The solvent is evaporated and the residue dissolved in benzene and filtered through an aluminium oxide column. On evaporation, a colourless liquid is obtained and this is dissolved in ether and treated with a solution of hydrogen chloride gas in isopropanol; one thus obtains 4-acetyl-5 - methyl-1-(1-methyl-4-piperidyl)-pyrazole monohydrochloride which, after recrystallisation from a mixture of methanol and isopropanol, melts at 302° (with decomposition).

EXAMPLE 13

A mixture of 2.56 g. of 4-acetyl-5-methyl-1-(1-methyl-4-piperidyl)-pyrazole monohydrochloride and 0.9 g. of paraformaldehyde in 30 ml. of ethanol is treated with 2.3 g. of 4-(4-chlorophenyl)-1,2,5,6-tetrahydropyridine hydrochloride and 2 drops of concentrated hydrochloric acid and boiled under reflux for 24 hours. On cooling, the 4 - {3 - [4 - (4-chlorophenyl)-1,2,5,6-tetrahydro-1-pyridyl]-1-oxo-propyl}-5-methyl - 1 - (1 - methyl-4-piperidyl)-pyrazole dihydrochloride of formula

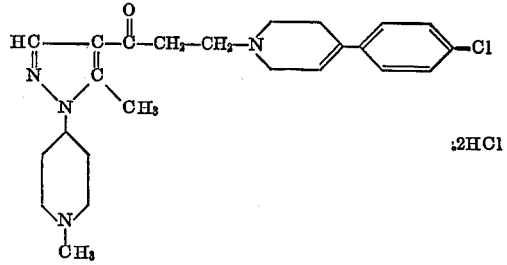

crystallises out; after recrystallisation from a mixture of methanol and isopropanol, the product melts at 269–270° (with decomposition) and is converted to the free compound by treatment with a suitable base, for example 1 N aqueous potassium hydroxide.

EXAMPLE 14

A mixture of 2.94 g. of 4-acetyl-1-carbethoxy-5-methyl-pyrazole and 1.35 g. of paraformaldehyde in 60 ml. of ethanol is treated with 3.48 g. of 4-(4-chlorophenyl)-piperidine hydrochloride and 4 drops of concentrated hydrochloric acid; the mixture is boiled under reflux for 24 hours and then cooled. The 1-carbethoxy-4-{3-[4-(4-chlorophenyl)-piperidino] - 1 - oxo-propyl}-5-methyl-pyrazole hydrochloride of formula

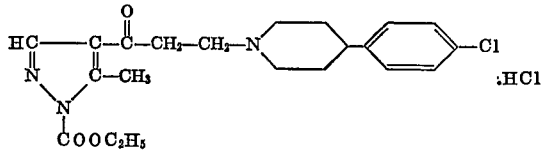

crystallises out and melts at 215–216° (with decomposition) after recrystallisation from methanol. It is converted to the free compound by treatment with a suitable alkaline reagent.

The starting material used in the above example is prepared as follows:

A mixture of 120 g. of ethoxymethylene-acetyl-acetone in 250 ml. of ether is cooled to 0° and treated dropwise with a solution of 80 g. of 1-carbethoxy-hydrazine in 750 ml. of ether; the addition of the solution is complete after 2 hours and the reaction mixture is stirred for 8 hours at room temperature. The crystalline material is filtered off and recrystallised from a mixture of methanol and isopropanol; the resulting hydrazone melts at 140°. 145 g. of the product are heated for 3 hours at 160° in an atmosphere of nitrogen. After cooling to room temperature, the product is diluted with 500 ml. of ether and the mixture is evaporated to dryness. The residue is recrystallised from ether and yields 4-acetyl-1-carbethoxy-5-methyl-pyrazole, which melts at 67°. Its thiosemicarbazone melts at 212° and its guanylhydrazone hydrochloride at 206°.

EXAMPLE 15

A solution of 2 g. of 5-methyl-4-{3-[4-(4-chlorophenyl)-1,2,5,6-tetrahydro - 1 - pyridyl] - 1-oxo-propyl}-1-phenylpyrazole hydrochloride in 100 ml. of 50% aqueous methanol is added dropwise at room temperature to a solution of 0.2 g. of sodium borohydride in 50 ml. of 50% aqueous methanol. The reaction mixture is stirred for 1 hour at room temperature and boiled under reflux for 5 hours. On cooling, one obtains a crystalline precipitate which is filtered off and yields the 4-{3-[4-(4-chlorophenyl) - 1,2,5,6 - tetrahydro-1-pyridyl]-1-hydroxy-propyl}-5-methyl-1-phenyl-pyrazole of formula

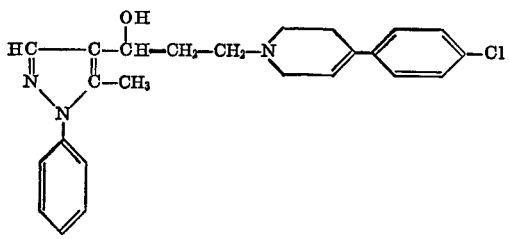

which, after recrystallisation from a mixture of methylene chloride and n-hexane, melts at 135–136°.

EXAMPLE 16

20 g. of 1-carbethoxy-5-methyl-4-[1-oxo-3-(4-phenyl-1,2,5,6 - tetrahydro - 1 - pyridyl)-propyl]-pyrazole hydrochloride and 130 g. of corn starch are intimately mixed and treated with a paste made of 30 g. of maize starch and 100 g. of distilled water. The mass is thoroughly kneaded, granulated and dried at 45°. A mixture of 14 g. of talc and 6 g. of magnesium stearate is added to the granules and the mixture is thoroughly mixed and then converted to tablets, each containing 0.01 g. or 0.05 g. of the active substance.

EXAMPLE 17

A mixture of 1.6 g. of 4-acetyl-1-(4-carbethoxyphenyl)-5-methyl-pyrazole and 0.54 g. of paraformaldehyde in 20 ml. ethanol is treated with 1.3 g. of 4-phenyl-1,2,5,6-tetrahydropyridine hydrochloride and 2 drops of concentrated hydrochloric acid. The reaction mixture is boiled under reflux for 24 hours. On cooling, the 1-(4-carbethoxyphenyl) - 5 - methyl-4-[1-oxo-3-(4-phenyl-1,2,5,6-tetrahydro - 1 - pyridyl)-propyl]-pyrazole hydrochloride of the formula

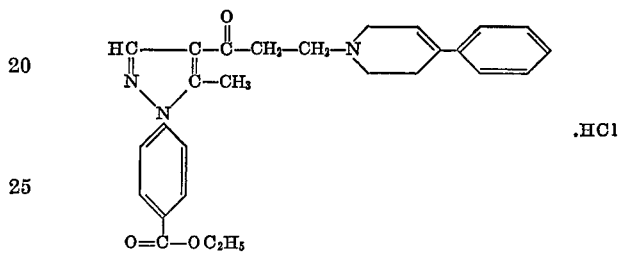

crystallizes; it melts at 217–218° (with decomposition) after recrystallisation from a mixture of methanol and isopropanol. The free base is obtained by basification of the aqueous solution of the above salt with a solution of 1 N aqueous sodium hydroxide.

The starting material used in the above reaction is prepared as follows:

A solution of 15.6 g. of ethoxy-methylene-acetyl-acetone in 50 ml. of ether is cooled to 0° and treated dropwise with 18 g. of 4-hydrazino-benzoic acid ethyl ester in 200 ml. of ether. The addition of the latter is complete in 55 minutes and the mixture is stirred for 18 hours at room temperature. The solvent is evaporated off to afford a crystalline residue. This is recrystallised from a mixture of ether and hexane to yield 1-(4-carbethoxyphenyl)-4-acetyl-5-methyl-pyrazole, M.P. 114°.

EXAMPLE 18

A mixture of 4.9 g. of 4-acetyl-1-(3-chloro-4-methylphenyl)-5-methyl-pyrazole and 1.8 g. of paraformaldehyde in 50 ml. of ethanol is treated with 4.5 g. of 4-phenyl-1,2,5,6-tetrahydro-pyridine hydrochloride and 4 drops of concentrated hydrochloric acid; the reaction mixture is boiled under reflux for 24 hours. On cooling, the 1-(3-chloro - 4 - methyl - phenyl) - 5-methyl-4[1-oxo-3-(4-phenyl-1,2,5,6 - tetrahydro - 1 - pyridyl)-propyl]-pyrazole hydrochloride of the formula

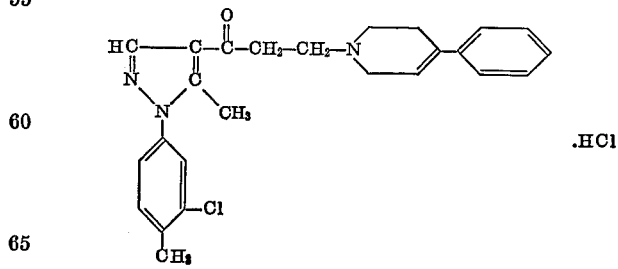

crystallises; it melts at 225° (with decomposition) after recrystallisation from methanol. The free base is obtained by basification of the aqueous solution of the salt with 1 N aqueous sodium hydroxide.

The starting material used is prepared as follows:

A solution of 44 g. of ethoxymethylene-acetyl-acetone in 100 ml. of ether is treated dropwise at 0° with a solution of 44 g. of 3-chloro-4-methyl-phenyl-hydrazine in 400 ml. ether. The addition of the latter is complete in 2 hours and the reaction is stirred for 18 hours at room temperature. The solvent is evaporated off, and the crystalline residue is recrystallised from isopropanol to afford the 1-(3-chloro - 4 - methyl - phenyl) - 4 - acetyl-5-methyl-pyrazole, M.P. 84°; its guanyl-hydrazone hydrochloride melts at 252°.

EXAMPLE 19

A mixture of 10 g. of 4 - acetyl - 5-methyl-1-phenyl-pyrazole and 4.5 g. of paraformaldehyde in 120 ml. of ethanol is treated with 8.1 g. of 3 - aza - bicyclo[3,2,2] nonane hydrochloride and 17 drops of concentrated hydrochloric acid; the reaction mixture is boiled under reflux for 24 hours. On cooling, the 4 - [3 - (3 - aza-3-bicyclo-[3,2,2]nonyl)-1-oxo-propyl] - 5 - methyl - 1 - phenyl-pyrazole hydrochloride of the formula

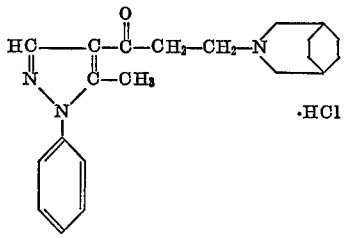

crystallises; it melts at 204° after recrystallization from a mixture of methanol and isopropanol. The free base is prepared by basification of the aqueous solution of the above salt with a 1 N aqueous sodium hydroxide solution.

Using the method outlined in the above example, the following compounds have been prepared by choosing appropriate starting materials:

4 - [3 - (3 - aza-3-bicyclo[3,2,2]nonyl)-1-oxo-propyl]-1-(2-hydroxyethyl)-5-methyl-pyrazole, the monohydrochloride of which melts at 234° after recrystallization from methanol;

4 - [3 - (3 - aza - 3 - bicyclo[3,2,2]nonyl)-1-oxo-propyl] - 1 - (4 - bromophenyl)-5-methyl-pyrazole, the monohydrochloride of which melts at 194–195° after recrystallization from a mixture of methanol and isopropanol;

4 - [3 - (3 - aza - 3-bicyclo[3,2,2]nonyl)-1-oxo-propyl]-1 - (ethoxycarbonyl) - 5 - methyl-pyrazole, the monohydrochloride of which melts at 203–204° after recrystallization from methanol; and 4- [3 - (3 - aza - 3-bicyclo[3,2,2]nonyl)-1-oxo-propyl]-5-methyl-1-(4-methylphenyl)-pyrazole, the monohydrochloride of which melts at 210° after recrystallization from a mixture of isopropanol and ether.

EXAMPLE 20

A mixture of 8.4 g. of 4-acetyl-1-(2-hydroxyethyl)-5-methyl-pyrazole and 4.5 g. of paraformaldehyde in 100 ml. of ethanol is treated with 6.7 g. of hexahydroazepine hydrochloride and 10 drops of concentrated hydrochloric acid; the reaction mixture is boiled under reflux for 24 hours. On cooling and addition of ether, the 4-[3-(1-hexahydroazepinyl) - 1 - oxo - propyl] - 1 - (2-hydroxyethyl)-5-methylpyrazole monohydrochloride of the formula

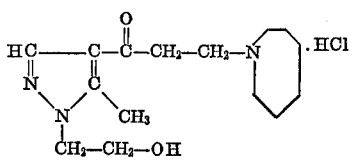

crystallizes; it melts at 156° (with decomposition) after recrystallization from methanol. The free base is obtained by basification of the aqueous solution of the above salt with a solution of 1 N aqueous hydroxide.

A mixture of 6 g. of 4-acetyl-5-methyl-1-phenylpyrazole and 2.7 g. of paraformaldehyde in 80 ml. of ethanol is treated with 6.2 g. of hexahydroazepine hydrochloride and 10 drops of concentrated hydrochloric acid. The reaction mixture is boiled under reflux for 24 hours; on cooling and diluting with ether, the 4-[3-(1-hexahydroazepinyl)-1-oxo-propyl] - 5 - methyl - 1 - phenyl-pyrazole monohydrochloride of the formula

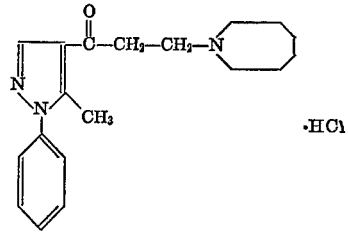

is obtained, which melts at 175° after recrystallization from a mixture of ethanol and ether.

Using the method outlined in the above example, the following compounds have been prepared by choosing appropriate starting materials:

5 - methyl - 1 - phenyl - 4 - [3-(1-octahydro-azocinyl)-1-oxo-propyl]-pyrazole, the monohydrochloride of which melts at 154–155° (with decomposition) after recrystallization from a mixture of ethanol and ether;

5 - methyl - 4 - [3 - (4 - morpholino) - 1 - oxo-propyl]-1-phenyl-pyrazole, the monohydrochloride of which melts at 241–242° (with decomposition) after recrystallization from a mixture of ethanol and ethyl acetate; and 5 - methyl - 4 - (1 - oxo-3-piperidino-propyl)-1-phenyl-pyrazole, the monohydrochloride of which melts at 220° (with decomposition) after recrystallization from a mixture of methanol and isopropanol.

EXAMPLE 21

A solution of 1.8 g. of 4-[3-(1-hexahydroazepinyl)-1-oxo-propyl] - 5 - methyl - 1 - phenyl-pyrazole monohydrochloride in 80 ml. of ethanol is hydrogenated over 0.1 g. of Adam's platinum oxide catalyst at a pressure of about 3 atmospheres. After the theoretical uptake of hydrogen, the hydrogenated solution is filtered, evaporated to dryness and the residue is recrystallized from a mixture of ethanol and ethyl acetate to afford the 4-[3-(1-hexahydro-azepinyl) - 1 - hydroxy-propyl] - 5 - methyl-1-phenyl-pyrazole monohydrochloride of the formula

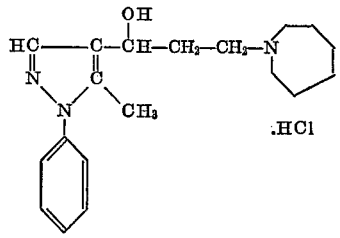

which melts at 215–216° (with decomposition). The free base is obtained by basification of the aqueous solution of the above salt with a solution of 1 N aqueous sodium hydroxide.

EXAMPLE 22

A mixture of 6 g. of 1-phenyl-4-acetyl-5-methylpyrazole and 2.70 g. of paraformaldehyde in 80 ml. of ethanol is treated with 8.1 g. of 4-carbethoxy-4-phenyl-piperidine hydrochloride and 10 drops of concentrated hydrochloric acid; the reaction mixture is boiled under reflux for 24 hours. On concentrating the reaction mixture to one-third of its volume and adding 60 ml. of ether followed by cooling, the 4 - [3-(4-carbethoxy-4-phenyl-piperidino)-1- oxo - propyl] - 5 - methyl - 1 - phenyl-pyrazole monohydrochloride of the formula

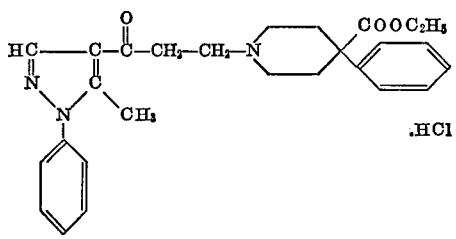

crystallizes; it melts at 135° (with decomposition) after recrystallization from a mixture of methanol and ethyl acetate. The free base is prepared by basification of the aqueous solution of the salt with a solution of 1 N aqueous sodium hydroxide.

EXAMPLE 23

A mixture of 5.12 g. of 4-acetyl-5-methyl-1-(1-methyl-4-piperidyl)-pyrazole monohydrochloride and 1.8 g. of paraformaldehyde in 70 ml. of ethanol is treated with 5.40 g. of 4-carbethoxy-4-phenyl-piperidine hydrochloride and 6 drops of concentrated hydrochloric acid; the reaction mixture is boiled under reflux for 24 hours. On concentrating the reaction mixture to one-half of its volume, followed by cooling, the 4-[3-(4-carbethoxy-4-phenyl-piperidino)-1-oxo-propyl]-5-methyl - 1 - (1 - methyl-4-piperidyl)-pyrazole dihydrochloride of the formula

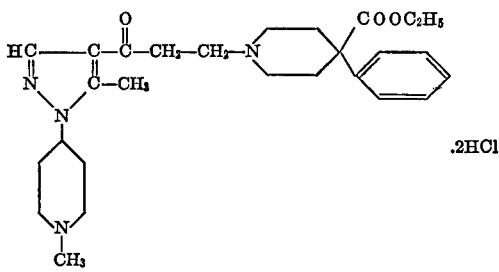

crystallizes; it melts at 270–272° after recrystallization from a mixture of methanol and isopropanol. The free base is prepared by basification of the aqueous solution of the salt with a solution of 1 N aqueous sodium hydroxide.

EXAMPLE 24

A mixture of 5.12 g. of 4-acetyl-5-methyl-1-(1-methyl-4-piperidyl)-pyrazole monohydrochloride and 1.8 g. of paraformaldehyde in 60 ml. of ethanol is treated with 3.24 g. of 3-azabicyclo[3,2,2]nonane hydrochloride and 6 drops of concentrated hydrochloric acid; the reaction mixture is boiled under reflux for 24 hours. On cooling, the 4-{3-(3 - aza-3-bicyclo[3,2,2]nonyl)-1-oxo-propyl}-5-methyl-1-(1-methyl-4-piperidyl)-pyrazole dihydrochloride of the formula

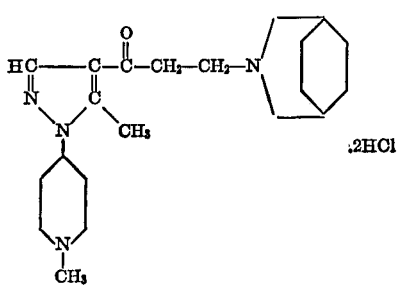

crystallizes; it melts at 268–270° after recrystallization from methanol and isopropanol. The free base is prepared by basification of the aqueous solution of the above salt with a 1 N aqueous sodium hydroxide solution.

EXAMPLE 25

A mixture of 2 g. of 4-acetyl-1-(4-fluorophenyl)-5-phenyl-pyrazole and 0.7 g. of paraformaldehyde in 25 ml. of ethanol is treated with 1.05 g. of 4-phenyl-1,2,5,6-tetrahydropyridine hydrochloride and 2 drops of concentrated hydrochloric acid; the reaction mixture is boiled under reflux for 24 hours. On cooling, the 1-(4-fluorophenyl) - 4 - [1 - oxo-3-(4-phenyl-1,2,5,6-tetrahydro-1-pyridyl)-propyl]-5-phenyl-pyrazole monohydrochloride of the formula

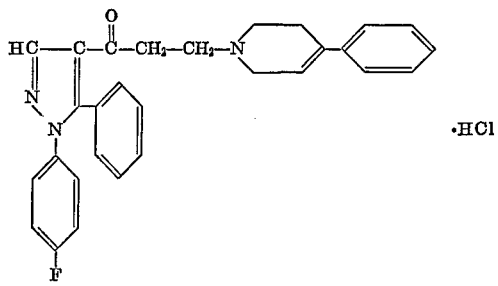

crystallizes; it melts at 198–200° after recrystallization from a mixture of methanol, isopropanol and ether. The free base is prepared by basification of the aqueous solution of the above salt with a 1 N aqueous sodium hydroxide solution.

The starting material used in the above reaction is prepared as follows:

A mixture of 81 g. of benzoyl-acetone, 162 g. of triethyl orthoformate and 324 g. of acetic anhydride is boiled under reflux for 2 hours. The volatile compounds e.g. ethyl acetate etc., are distilled off, and the fraction boiling at 165–174°/5 mm., is collected to yield the ethoxymethylene-benzoylacetone, which solidifies on cooling and melts at 78–80° after recrystallization from a mixture of ether and hexane.

A solution of 21.8 g. of ethoxymethylene-benzoylacetone in 250 ml. of ether is cooled to 0° and treated dropwise with 12.6 g. of 4-fluorophenyl-hydrazine in 300 ml. of ether; the addition of the latter is complete in 2 hours, and the reaction mixture is stirred for 18 hours at room temperature. The solvent is evaporated off to afford a crystalline residue, which is recrystallized from isopropanol to remove the 4-benzoyl-1-(4-fluorophenyl)-5-methyl-pyrazole, M.P. 146°. The mother liquor is evaporated to dryness and a solution of the residue is filtered through an aluminum oxide column to afford the 4-acetyl-1-(4-fluorophenyl)-5-phenyl-pyrazole, which is recrystallized from a mixture of methylene chloride and hexane and melts at 80–82°.

EXAMPLE 26

A mixture of 5.13 g. of 4-acetyl-(4-bromo-phenyl)-5-phenyl-pyrazole and 1.35 g. of paraformaldehyde in 50 ml. of ethanol is treated with 3 g. of 4-phenyl-1,2,5,6-tetrahydropyridine hydrochloride and 4 drops of concentrated hydrochloric acid; the reaction mixture is boiled under reflux for 24 hours. On cooling, the 1-(4-bromo-phenyl)-4-[1 - oxo-3-(4-phenyl-1,2,5,6-tetrahydro-1-pyridyl)-propyl]-5-phenyl-pyrazole monohydrochloride of the formula

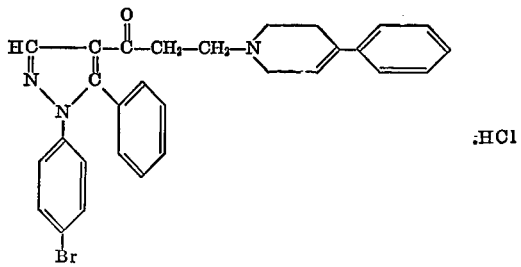

crystallizes; it melts at 199–200° after recrystallization from isopropanol. The free base is obtained on basification of an aqueous solution of the above salt with 1 N aqueous sodium hydroxide solution.

The starting material used in the above reaction is prepared as follows:

A solution of 19.2 g. of ethoxymethylene-benzoyl-acetone in 500 ml. of ether is cooled to 0° and treated dropwise with a solution of 16.5 g. of 4-bromophenyl-hydrazine in 200 ml. of tetrahydrofuran. The addition of the latter is complete in 2 hours and the reaction mixture is stirred for 18 hours at room temperature. The solvent is evaporated to afford a crystalline residue, which is chromatographed on a column of aluminum oxide. The fraction eluted with a 1:2-mixture of benzene and hexane is 1-(4-bromophenyl)-4-benzoyl-5-methyl-pyrazole, M.P. 127–128°, which is followed by elution with a 1:1-mixture of benzene and chloroform to yield 4-acetyl-1-(4-bromophenyl)-5-phenyl-pyrazole, which crystallizes from a mixture of isopropanol and hexane and melts at 143–145°.

EXAMPLE 27

A mixture of 7.38 g. of 4-acetyl-1-(4-methylmercapto-phenyl)-5-methyl-pyrazole and 2.7 g. of paraformaldehyde in 75 ml. of ethanol is treated with 5.88 g. of 4-phenyl-1,2,5,6-tetrahydropyridine hydrochloride and 10 drops of concentrated hydrochloric acid and boiled under reflux for 16 hours. The 1-(4-methylmercapto-phenyl)-5-methyl-4-[1-oxo-3-(4-phenyl-1,2,5,6-tetrahydro-1-pyridyl)-propyl]-pyrazole monohydrochloride of the formula

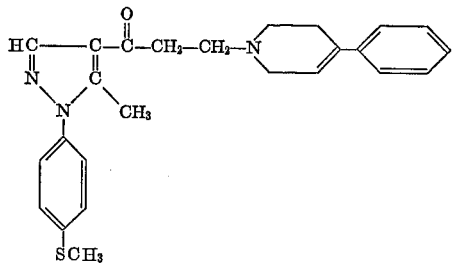

crystallizes on cooling; after recrystallization from methanol, its melts at 208–210°. The free base is obtained by treatment with suitable alkaline agent, such as 1 N aqueous sodium hydroxide solution.

The starting material used in the above example is prepared as follows:

88 g. of ethoxymethylene-acetylacetone in 300 ml. of ether is cooled to 0° and a solution of 87 g. of 4-methyl-mercapto-phenyl-hydrazine in 700 ml. of ether is added dropwise at 10°. The reaction mixture is stirred at room temperature for 10 hours, and the resulting crystalline precipitate is filtered off and recrystallized from a mixture of ether and petroleum ether, to yield the 1-(4-methyl-mercapto-phenyl)-4-acetyl-5-methyl-pyrazole, M.P. 112°.

EXAMPLE 28

A mixture of 3.92 g. of 4-acetyl-1-carboethoxy-5-methyl-pyrazole and 1.8 g. of paraformaldehyde in 55 ml. of ethanol is treated with 5.4 g. of 4-carboethoxy-4-phenyl-piperidine hydrochloride and 6 drops of concentrated hydrochloric acid; the reaction mixture is boiled under reflux for 24 hours. On concentrating the reaction mixture to one-third of its volume and adding 60 ml. of ether, followed by cooling at 0° for 24 hours, the 1-carbo-ethoxy-4-[3-(4-carboethoxy-4-phenyl-1-piperidino)-1-oxo-propyl]-5-methyl-pyrazole monohydrochloride of the formula

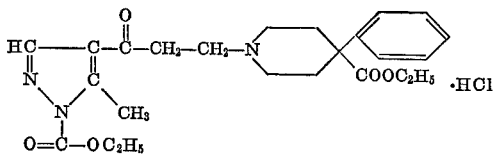

crystallizes; it melts at 165–167° after recrystallization from a mixture of isopropanol, ethyl acetate and ether. The free base is prepared by basification of an aqueous solution of the salt with a 1 N aqueous solution of sodium hydroxide.

The following compounds may be obtained by the above method by choosing the appropriate starting materials:

4 - [3 - (4 - carboethoxy - 4-phenyl-piperidino)-1-oxo-propyl]-1-(4-fluorophenyl)-5-methyl-pyrazole, the monohydrochloride of which melts at 140–142° after recrystallization from a mixture of ethyl acetate and ether;

4 - {3 - [4-hydroxy-4-(3-trifluoromethylphenyl)-piperidino] - 1 - oxo-propyl}-5-methyl-1-phenyl-pyrazole, the monohydrochloride of which melts at 235–237° after recrystallization from isopropanol;

4 - [3 - (4 - carboxamido - 4-phenyl-piperidino)-1-oxo-propyl]-5-methyl-1-phenyl-pyrazole, the monohydrochloride monohydrate of which melts at 223° after recrystallization from a mixture of methanol and isopropanol;

4 - [3 - (4 - carbomethoxy - 4-phenyl-piperidino)-1-oxo-propyl]-1-(4-fluorophenyl)-5-methyl-pyrazole, the monohydrochloride of which melts at 199° after recrystallization from a mixture of methanol, ispropoanol and ether;

4 - [3 - (4 - carbo-n-butoxy-4-phenyl-piperidino)-1-oxo-propyl]-1-(4-fluorophenyl)-5-methyl-pyrazole, the monohydrochloride of which melts at 220–221° (with decomposition) after recrystallization from a mixture of ethyl acetate and ether;

4 - [3 - (4 - carboethoxy-4-phenyl-piperidino)-1-oxo-propyl]-1-(2-fluorophenyl)-5-methyl-pyrazole, the monohydrochloride monohydrate of which melts at 118–120° after recrystallization from a mixture of isopropanol, ethyl acetate and ether; and 1 - (4 - fluorophenyl) - 4 - [3-(4-methoxy-4-phenyl-1-piperidino)-1-oxo-propyl]-5-methyl-pyrazole, the maleate monohydrate of which melts at 115–116° after recrystallization from a mixture of isopropanol, ethyl acetate and ether.

EXAMPLE 29

A mixture of 5.8 g. of 4-acetyl-1-(7-chloro-4-quinolinyl)-5-methyl-pyrazole and 1.8 g. of paraformaldehyde in 60 ml. of ethanol is treated with 4 g. of 4-phenyl-1,2,5,6-tetrahydro-pyridine hydrochloride and 6 drops of concentrated hydrochloric acid and boiled under reflux overnight. The 1-(7-chloro-4-quinolinyl)-5-methyl-4-[1-oxo-3-(4 - phenyl-1,2,5,6-tetrahydro-1-pyridyl)-propyl]-pyrazole monohydrochloride of the formula

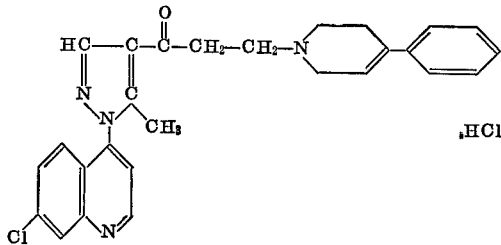

crystallizes out on cooling; after recrystallization from a mixture of isopropanol and ether, it melts at 153°. The free base is obtained by treatment with suitable alkaline agent, such as a 1 N aqueous sodium hydroxide solution.

The starting material used in the above example is prepared as follows:

A mixture of 20.1 g. of ethoxymethylene-acetyl-acetone in 40 ml. of tetrahydrofuran is cooled to 0° and treated dropwise with a solution of 25 g. of 7-chloro-4-hydrazino-quinoline in 250 ml. of tetrahydrofuran; the addition of the solution is complete after 2 hours, and the reaction mixture is stirred for 8 hours at room temperature. The crystalline material is filtered off and recrystallized from a mixture of methanol and isopropanol; the resulting hydrazone melts at 185–190°. 36 g. of this product are heated for 6 hours at 190° in an atmosphere of nitrogen. After cooling to room temperature, the product is diluted with 50 ml. of methanol and the mixture is filtered. The residue is recrystallized from methanol and affords 4-acetyl - 1 - (7-chloro - 4 - quinolinyl) - 5-methyl-pyrazole, M.P. 142–146°.

The following compound is obtained by the method described in the above example by choosing the appropriate starting material:

5-methyl - 4 - [1-oxo - 3 - (4-phenyl-1,2,5,6-tetrahydro-1-pyridyl)-propyl] - 1 - (4 - quinolinyl)-pyrazole, the monohydrochloride of which melts at 200–202° (with decomposition) after recrystallization from a mixture of methanol, isopropanol and ether.

EXAMPLE 30

A mixture of 7.38 g. 4-acetyl - 1 - (3-methylmercapto-phenyl) - 5 - methyl-pyrazole and 2.7 g. of paraformaldehyde in 75 ml. of ethanol is treated with 5.88 g. of 4-phenyl - 1,2,5,6 - tetrahydro-pyridine hydrochloride and 10 drops of concentrated hydrochloric acid and boiled under reflux for 16 hours. The 1-(3 - methylmercapto-phenyl) - 5 - methyl - 4 - [1 - oxo - 3 - (4 - phenyl - 1,2,5,6 - tetrahydro - 1 - pyridyl) - propyl] - pyrazole monohydrochloride of the formula

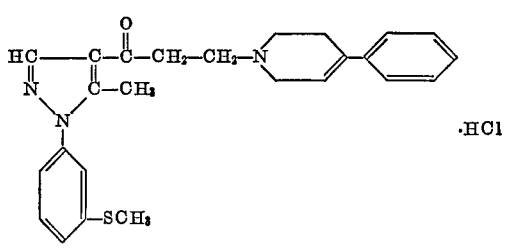

crystallizes on cooling; after recrystallization from methanol, it melts at 183–184° (with decomposition). The free base is obtained by treatment with suitable alkaline agent, such as a 1 N aqueous sodium hydroxide solution.

The starting material used in the above example is prepared as follows:

27.3 g. of ethoxymethylene-acetylacetone in 100 ml. of ether is cooled to 0° and a solution of 27 g. of 3-methyl-mercapto-phenyl-hydrazine in 250 ml. of ether is added dropwise at 10°; the reaction mixture is stirred at room temperature for 18 hours. The resulting crystalline precipitate is filtered off and recrystallized from a mixture of ether and petroleum ether; the resulting 4-acetyl-1-(3-methylmercapto-phenyl)-5-methyl-pyrazole melts at 83°.

The following compounds may be obtained by the procedure described in the above example by choosing the appropriate starting materials:

5 - methyl - 1 - (4 - methylphenyl) - 4 - {3 - [4-(4-methyl-phenyl) - 1,2,5,6 - tetrahydro - 1 - pyridyl] - 1-oxo-propyl}-pyrazole, the monhydrochloride of which melts at 201–202° after recrystallization from a mixture of methanol, isopropanol and ether; and 1 - (4 - bromophenyl) - 5 - methyl - 4 - {3 - [4 - (4-methyl - phenyl) - 1,2,5,6 - tetrahydro - 1 - pyridyl] - 1-oxo-propyl}-pyrazole, the monohydrochloride monohydrate of which melts at 207–208° after recrystallization from a mixture of methanol and isopropanol.

EXAMPLE 31

A mixture of 4.36 g. of 4-acetyl-1-(4-fluoro-phenyl)-5-methyl-pyrazole and 1.8 g. of paraformaldehyde in 50 ml. of absolute ethanol is treated with 4.28 g. of 4-(4-fluorophenyl) - 1,2,5,6 - tetrahydropyridine hydrochloride and 6 drops of concentrated hydrochloric acid and boiled under reflux for 16 hours. The 1-(4-fluorophenyl)-4-{3-[4-(4-fluorophenyl) - 1,2,5,6 - tetrahydro-1-pyridyl]-1-oxo-propyl}-5-methyl-pyrazole monohydrochloride of the formula

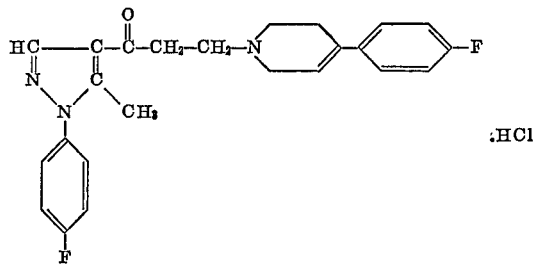

crystallizes on cooling; after recrystallization from a mixture of chloroform and methanol, it melts at 206–208°. The free base is obtained by treatment with suitable alkaline agent, such as a 1 N aqueous sodium hydroxide solution.

The following compounds may be obtained by the above method by choosing the appropriate starting materials:

1 - (4 - bromophenyl) - 4 - {3 - [4 - (4 - fluorophenyl)-1,2,5,6 - tetrahydro - 1 - pyridyl] - 1 - oxo-propyl} - 5-methyl-pyrazole, the monohydrochloride of which melts at 203–204° (with decomposition) after recrystallization from isopropanol; and 4 - {3 - [4 - (4 - fluorophenyl) - 1,2,5,6 - tetrahydro-1-pyridyl] - 1 - oxo-propyl} - 5 - methyl-1-phenyl-pyrazole, the monohydrochloride of which melts at 212° after recrystallization from a mixture of methanol, isopropanol and ether.

EXAMPLE 32

A solution of 4.5 g. of 1-(4-fluorophenyl)-4-{3-[4-(4-fluorophenyl) - 1,2,5,6 - tetrahydro - 1 - pyridyl]-1-oxo-propyl} - 5 - methyl-pyrazole monohydrochloride in 250 ml. of methanol is shaken with hydrogen in the presence of 0.5 g. of a 10% palladium-on-charcoal catalyst at room temperature and under atmospheric pressure. The resulting reaction mixture is filtered, and the filtrate is evaporated to dryness. The residue is recrystallized from a mixture of isopropanol and ether to afford the 1-(4-fluorophenyl) - 4 - {3 - [4 - fluorophenyl)-piperidino]-1-oxo-propyl} - 5 - methyl - pyrazole monohydrochloride of the formula

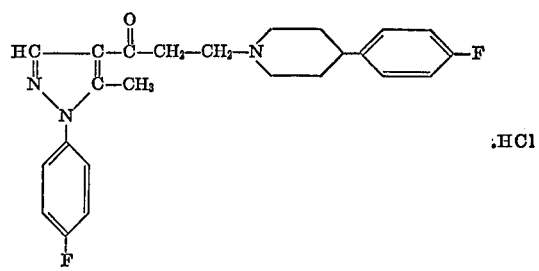

which melts at 220–221°. The free base is obtained by treatment with a suitable alkaline agent, such as a 1 N aqueous sodium hydroxide solution.

The above compound is also prepared by Mannich condensation of 4-acetyl-1-(4-fluorophenyl)-5-methyl-pyrazole with 4-(4-fluorophenyl)-piperidine hydrochloride in the presence of paraformaldehyde and catalytic amounts of concentrated hydrochloric acid in ethanolic solution according to the procedure described in Example 1.

EXAMPLE 33

A mixture of 6.3 g. of 4-acetyl-(3,5-bis-carbomethoxy-phenyl)-5-methyl-pyrazole and 1.8 g. of paraformaldehyde in 120 ml. of ethanol is treated with 3.9 g. of 4-phenyl-1,2,5,6-tetrahydropyridine hydrochloride and 5 drops of concentrated hydrochloric acid and boiled under reflux for 16 hours. The 1-(3,5-bis-carbomethoxyphenyl)-5-methyl-[1-oxo-3-(4-phenyl-1,2,5,6-tetrahydro - 1 - pyridyl)-propyl]-pyrazole monohydrochloride monohydrate of the formula

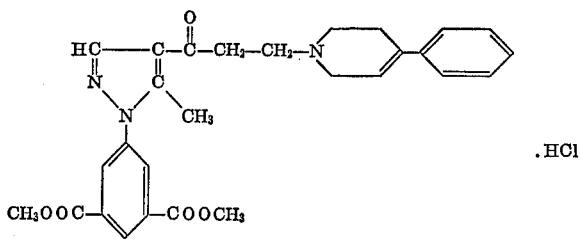

crystallizes; after recrystallization from a mixture of isopropanol and ether, it melts at 158–159°. The free base is obtained by treatment of an aqueous solution of the above salt with a suitable alkaline agent, such as a 1 N aqueous sodium hydroxide solution.

The starting material is prepared as follows:

A solution of 26.4 g. of ethoxymethylene-acetylacetone in 50 ml. ethyl acetate is treated dropwise at 0° with a solution of 37.5 g. of 3,5-bis-carbomethoxy-phenyl-hydrazine in 200 ml. of dry ethyl acetate. The reaction mixture is stirred at room temperature for 48 hours and the resulting crystalline precipitate is filtered off and recrystallized from isopropanol to afford the 4-acetyl-(3,5-bis-carbomethoxyphenyl)-5-methyl-pyrazole, which melts at 169°.

EXAMPLE 34

A mixture of 2.18 g. of 4-acetyl-1-(2-fluorophenyl)-5-methyl-pyrazole and 0.9 g. of paraformaldehyde in 30 ml. of absolute ethanol is treated with 2.2 g. of 4-(4-fluorophenyl)-1,2,5,6 - tetrahydropyridine hydrochloride and 3 drops of concentrated hydrochloric acid and boiled under reflux for 16 hours. The 1-(2-fluorophenyl)-5-methyl-4-{3-[4-(4-fluorophenyl) - 1,2,5,6 - tetrahydro-1-pyridyl]-1-oxo-propyl}-pyrazole monohydrochloride of the formula

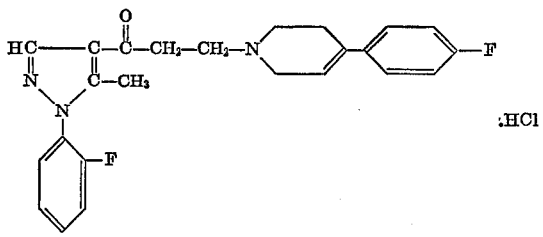

crystallizes on cooling; after recrystallization from a mixture of methanol and isopropanol, it melts at 217–218°. The free base is obtained by treatment with suitable alkaline agent, such as a 1 N aqueous sodium hydroxide solution.

EXAMPLE 35

A mixture of 3.36 g. of 4-acetyl-1-(3,5-bis-trifluoromethyl-phenyl)-5-methyl-pyrazole and 0.9 g. of paraformaldehyde in 30 ml. of absolute ethanol is treated with 2.2 g. of 4-(4-fluoro-phenyl)-1,2,5,6-tetrahydropyridine hydrochloride and 4 drops of concentrated hydrochloric acid and boiled under reflux for 16 hours. The 1 - (3,5 - bis - trifluoromethylphenyl)-4-{3-[4-(4-fluorophenyl)-1,2,5,6-tetrahydro - 1 - pyridyl]-1-oxo-propyl}-5-methyl-pyrazole monohydrochloride of the formula

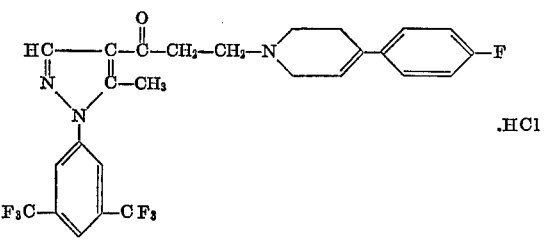

crystallizes on cooling; after recrystallization from a mixture of ethanol, isopropanol and ether, it melts at 212°.

The starting material for the above compound is prepared as follows:

A solution of 66 g. of ethoxymethylene-acetylacetone in 130 ml. of ether is treated dopwise at 0° with a solution of 102 g. of 3,5-bis-trifluoromethyl-phenyl-hydrazine in 600 ml. of ether. The reaction mixture is stirred at room temperature for 18 hours and the resulting solution is evaporated to dryness; the residue is recrystallized from isopropanol to afford the 4-acetyl-1-(3,5-bis-trifluoromethylphenyl)-5-methyl-pyrazole, M.P. 112–113°.

EXAMPLE 36

A mixture of 6.54 g. of 4-acetyl-1-(4-fluorophenyl)-5-methyl-pyrazole and 2.7 g. of paraformaldehyde in 80 ml. of ethanol is treated with 6.35 g. of 3-methyl-3-phenyl-piperidine hydrochloride and 10 drops of concentrated hydrochloric acid and boiled under reflux for 16 hours. The 1-(4-fluorophenyl)-5-methyl-4-[3-(3-methyl-3-phenyl-piperidino)-1-oxo-propyl]-pyrazole monohydrochloride of the formula

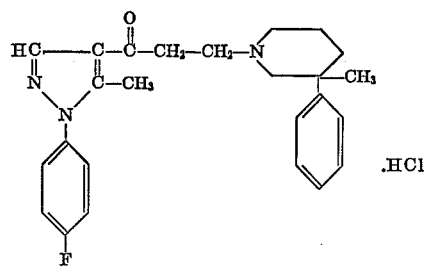

crystallizes on cooling; after recrystallization from isopropanol, it melts at 196°. The free base is obtained by treatment of an aqueous solution of the above salt with a suitable alkaline agent, such as a 1 N sodium hydroxide solution.

The following compound is obtained by the above method by choosing the appropriate starting materials:

5-methyl-4-[3-(3-methyl-3-phenyl - piperidino)-1-oxo-propyl]-1-phenyl-pyrazole, the monohydrochloride of which melts at 185–186° after recrystallization from a mixture of isopropanol and ether.

EXAMPLE 37

A mixture of 2.8 g. of 4-acetyl-1-(2-hydroxyethyl)-5-methyl-pyrazole and 1.8 g. of paraformaldehyde in 45 ml. of ethanol is treated with 4.4 g. of 4-(4-fluorophenyl-1,2,5,6-tetrahydropyridine hydrochloride and 6 drops of concentrated hydrochloric acid and boiled under reflux for 16 hours. The 4-{3-[4-(4-fluorophenyl)-1,2,5,6-tetrahydro - 1 - pyridyl]-1-oxo-propyl}-1-(2-hydroxyethyl)-5-methyl-pyrazole monohydrochloride hemihydrate of the formula

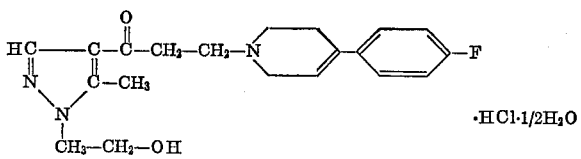

crystallizes on cooling. After recrystallization from a mixture of isopropanol and ether, it melts at 108–110°.

The following compounds may be obtained by the above method by choosing the appropriate starting materials:

4 - {3 - [4 - (4-chlorophenyl)-1,2,5,6-tetrahydro-1-pyridyl] - 1 - oxo-propyl} - 1-(2-hydroxyethyl)-5-methyl-pyrazole, the monohydrochloride hemihydrate of which melts at 144–145° (with decomposition) after recrystallization from a mixture of isopropanol and ether; and 1 - (2 - hydroxyethyl) - 5 - methyl-4-{3-[4-(4-methylphenyl) - 1,2,5,6 - tetrahydro - 1-pyridyl]-1-oxo-propyl}-pyrazole, the monohydrochloride hemihydrate of which melts at 148° after recrystallization from a mixture of isopropanol and ether.

EXAMPLE 38

A mixture of 11.81 g. of 4 - acetyl - 1-[2-(4-bromophenylsulfonyloxy)-ethyl] - 5 - methyl-pyrazole and 2.7 g. of paraformaldehyde in 105 ml. of ethanol is treated with 6.90 g. of 4-(4-chlorophenyl)-1,2,5,6-tetrahydropyridine hydrochloride and 9 drops of concentrated hydrochloric acid and boiled under reflux for 16 hours. The 1 - [2 - (4 - bromophenyl-sulfonyloxy)-ethyl]-4-{4-(4-chlorophenyl) - 1,2,5,6 - tetrahydro - 1 - pyridyl]-1-oxopropyl}-5-methyl-pyrazole monohydrochloride of the formula

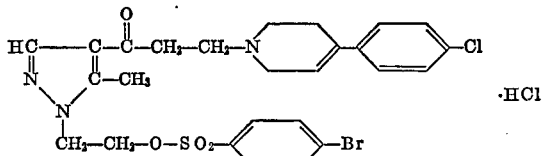

crystallizes out on cooling; after recrystallization from methanol, it melts at 185–186°. The free base is obtained by treatment of the aqueous solution of the salt with a suitable alkaline agent, such as 1 N aqueous sodium hydroxide.

The starting material used in the above example is prepared as follows:

A solution of 83 g. of 4-acetyl-1-(2-hydroxyethyl)-5-methyl-pyrazole in 750 ml. of dry tetrahydrofuran and 105 g. of triethylamine is treated with a solution of 128 g. of 4-bromobenzene sulfonyl chloride in 300 ml. of dry tetrahydrofuran. The reaction mixture is boiled under reflux for 4 hours and cooled to room temperature. A crystalline precipitate forms which is filtered off the filtrate is evaporated to dryness, and the residue is recrystallized from ethanol to yield the 4-acetyl-1-[2-(4-bromophenyl-sulfonyloxy)-ethyl]-5-methyl-pyrazole, M.P. 142°.

The following compounds may be obtained according to the above method by choosing appropriate starting materials:

1 - [2 - (4 - bromophenyl-sulfonyloxy)-ethyl]-5-methyl-4 - [1 - oxo - 3 - (4 - phenyl-1,2,5,6-tetrahydro-1-pyridyl)-propyl]-pyrazole, the monohydrochloride of which melts at 251° after recrystallization from methanol; and 1 - [2 - (4-bromophenyl-sulfonyloxy)-ethyl]-5-methyl-4 - {3 - [4 - (4 - methyl-phenyl)-1,2,5,6-tetrahydro-1-pyridyl]-1-oxo-propyl}-pyrazole, the monohydrochloride of which melts at 238° after recrystallization from methanol.

EXAMPLE 39

A mixture of 2.9 g. of 4 - acetyl - 5 - methyl-1-(3,4,5-trimethoxyphenyl)-pyrazole and 0.9 g. of paraformaldehyde in 30 ml. of ethanol is treated with 1.9 g. of 4-phenyl-1,2,5,6-tetrahydropyridine hydrochloride and 3 drops of concentrated hydrochloric acid and boiled under reflux for 16 hours. The 5 - methyl - 4 - [1-oxo-3-(4-phenyl-1,2,5,6 - tetrahydro-1-pyridyl)-propyl] - 1 - (3,4,5 - trimethoxyphenyl)-pyrazole monohydrochloride of the formula

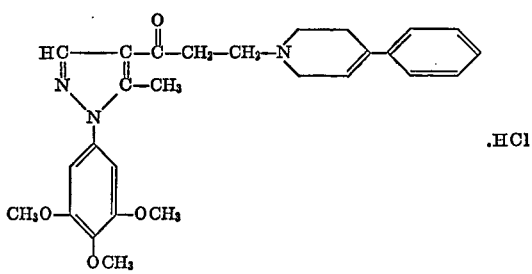

crystallizes on cooling; after recrystallization from methanol, it melts at 255° (with decomposition). The free base is obtained by treatment of an aqueous solution of the above salt with a suitable alkaline agent, such as 1 N aqueous sodium hydroxide.

The starting material used in the above example, is prepared as follows:

A solution of 7.4 g. of ethoxymethylene-acetylacetone in 100 ml. of ether is treated at 0° with portionwise addition of 7.4 g. of 3,4,5-trimethoxy-phenyl-hydrazine in 700 ml. of ether. The reaction mixture is stirred at room temperature for 18 hours and then evaporated to dryness. The residue is recrystallized from ethanol to afford the 4 - acetyl-5-methyl-1-(3,4,5-trimethoxyphenyl)-pyrazole, M.P. 174°.

EXAMPLE 40

A mixture of 6.8 g. of 4-acetyl-1-(2-hydroxyethyl)-5-methyl-pyrazole and 3.6 g. of paraformaldehyde in 85 ml. of ethanol is treated with 7 g. of decahydroquinoline hydrochloride and 10 drops of concentrated hydrochloric acid and boiled under reflux for 24 hours. The 4-[3-(decahydro - 1 - quinolinyl) - 1 - oxo-propyl]-1-(2-hydroxyethyl)-5-methyl-pyrazole monohydrochloride of the formula

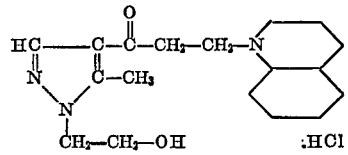

crystallizes on cooling; after recrystallization from isopropanol, it melts at 260°.

EXAMPLE 41

A mixture of 2.8 g. of 4-acetyl-1,5-dimethyl-pyrazole and 1.8 g. of paraformaldehyde in 50 ml. of ethanol is treated with 4 g. of 4-phenyl-1,2,5,6-tetrahydropyridine hydrochloride and 4 drops of concentrated hydrochloric acid and boiled under reflux for 24 hours. The 1,5-dimethyl - 4 - [1 - oxo-3-(4-phenyl-1,2,5,6-tetrahydro-1-pyridyl)-propyl]-pyrazole monohydrochloride of the formula

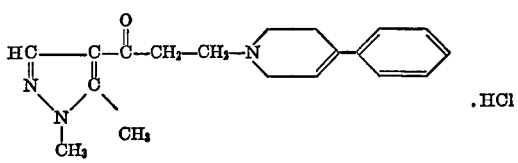

crystallizes on cooling; after recrystallization from a mixture of isopropanol and ether, it melts at 225°. The free base is obtained by treatment of the aqueous solution of the above salt with a suitable alkaline agent, such as a 1 N aqueous sodium hydroxide solution.

The starting material used in the above example, is prepared as follows:

A solution of 234 g. of ethoxymethylene-acetylacetone in 300 ml. ether is cooled to 0° and a solution of 69 g. of methyl-hydrazine in 900 ml. ether is added dropwise over a period of 4 hours. The reaction mixture is stirred at 10° for 18 hours and the crystalline precipitate is filtered off. It is recrystallized from isopropanol to afford the 4 - acetyl - 1,5 - dimethyl - pyrazole, M.P. 78–79°.

The following compound may be prepared by the method described above by choosing the appropriate starting materials:

4 - {3 - [4 - (4 - chlorophenyl)-1,2,5,6 - tetrahydro-1-pyridyl]-1-oxo-propyl} - 1,5 - dimethyl - pyrazole, the monohydrochloride of which melts at 204° (with decomposition) after recrystallization from isopropanol.

EXAMPLE 42

A mixture of 4 g. of 4 - acetyl - 1 - {2 - [4 - (4 - fluorophenyl) - 1 - piperazino] - ethyl} - 5 - methyl - pyrazole monohydrochloride dihydrate and 0.9 g. of paraformaldehyde in 30 ml. of ethanol is treated with 2.3 g. of 4-(4- chlorophenyl)-1,2,5,6-tetrahydro - pyridine hydrochloride and 4 drops of concentrated hydrochloric acid and the reaction mixture boiled under reflux for 24 hours. The 4 - {3 - [4 - (4 - chlorophenyl) - 1,2,5,6 - tetrahydro-1-pyridyl] - 1 - oxo - propyl} - 1 - {2 - [4 - (4 - fluorophenyl) - 1 - piperazino] - ethyl} - 5 - methyl pyrazole dihydrochloride dihydrate of the formula

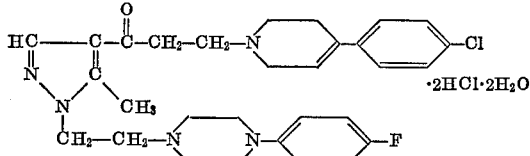

crystallizes out on cooling. After recrystallization from a mixture of isopropanol and ether, it melts at 172° (with decomposition). The base is obtained by treatment of the aqueous solution of this salt with a suitable alkaline agent, such as a 1 N aqueous sodium hydroxide solution.

The starting material used in the above example is prepared as follows:

A solution of 9.7 g. of 4-acetyl-1-[2-(4-bromophenyl-sulfonyloxy) - ethyl] - 5 - methyl - pyrazole in 150 ml. dioxane is treated with 12.5 g. of 4 - (4 - fluorophenyl)-piperazine and heated for 8 hours in a steel tube under pressure at 160°. On cooling, the reaction mixture is taken up in 300 ml. of methanol and the solvent is evaporated off to dryness. The residue is suspended in 200 ml. water and extracted with ethyl acetate. The organic extract is dried over anhydrous sodium sulfate and evaporated to dryness. The residue is dissolved in ether and adjusted to pH 2 with a solution of hydrogen chloride gas in isopropanol. The crystalline precipitate is filtered off and recrystallized from isopropanol to afford the 4-acetyl-1-{2 - [4 - (4 - fluorophenyl) - 1 - piperazino]-ethyl} - 5 - methyl - pyrazole monohydrochloride dihydrate, M.P. 198° (with decomposition).

EXAMPLE 43

A solution of 122 g. of 4 - {3 - [4 - (4 - fluorophenyl)-1,2,5,6 - tetrahydro - 1 - pyridyl] - 1 - oxo - propyl}-1-(2 - hydroxyethyl) - 5 - methyl - pyrazole monohydrochloride hemihydrate in 800 ml. of 50% aqueous methanol is treated with a cold 15% solution of sodium hydroxide in water to bring it to pH 8. A crystalline precipitate is formed on cooling to 5°, which is filtered off and recrystallized from a mixture of methylene chloride and hexane to afford the 4 - {3 - [4 - (4 - fluorophenyl)-1,2,5,6 - tetrahydro - 1 - pyridyl] - 1 - oxo - propyl} - 1-(2 - hydroxyethyl) - 5 - methylpyrazole, which melts at 147–148°.

EXAMPLE 44

A solution of 195 g. of 4 - {3 - [4-(4-fluorophenyl)-1,2,5,6 - tetrahydro - 1 - pyridyl] - 1 - oxo - propyl} - 1-(2 - hydroxyethyl) - 5 - methyl - pyrazole in 1000 ml. of methylene chloride is treated with a hot solution of 105 g. of citric acid in 200 ml. of methanol. The clear solution is concentrated and diluted with ether to afford a crystalline precipitate which is filtered off and recrystallized from a mixture of methanol and ether to yield the citrate of 4 - {3 - [4 - (4 - fluorophenyl) - 1,2,5,6-tetrahydro - 1 - pyridyl] - 1 - oxo - propyl} - 1 - (2-hydroxyethyl) - 5 - methyl-pyrazole, which melts at 136–138°.

EXAMPLE 45

A solution of 30 g. of 1 - (2 - hydroxyethyl)-5-methyl-4 - [1 - oxo - 3 - (4 - phenyl - 1,2,5,6 - tetrahydro - 1-pyridyl) - propyl] - pyrazole monohydrochloride in 800 ml. of water, containing 80 ml. methanol is treated with a saturated aqueous solution of sodium hydrogen carbonate to bring it to pH 7.5. The crystalline precipitate is filtered off and triturated with water, then recrystallised from a mixture of methylene chloride and hexane to afford the 1-(2-hydroxyethyl) - 5 - methyl-4-[1-oxo-3-(4-phenyl - 1,2,5,6 - tetrahydro - 1 - pyridyl) - propyl]-pyrazole, which melts at 145–147°.

EXAMPLE 46

A solution of 22.4 g. of 1-(2-hydroxyethyl) - 5 - methyl - 4 - [1 - oxo - 3 - (4 - phenyl-1,2,5,6-tetrahydro-1-pyridyl)-propyl]-pyrazole in 250 ml. of warm methylene chloride is treated with warm solution of 9.8 g. of maleic acid in 50 ml. of ethanol. The solution is concentrated to small volume and diluted with ether. The resulting crystalline precipitate is filtered off and recrystallized from a mixture of methanol, isopropanol and ether to afford the maleate of 1-(2-hydroxyethyl)-5-methyl-4-[1-oxo-3-(4-phenyl-1,2,5,6-tetrahydro - 1 - pyridyl)-propyl]-pyrazole, which melts at 112°.

EXAMPLE 47

A mixture of 3.87 g. of 4-acetyl-1-[3-(4-bromophenyl-sulfonyloxy)-ethyl]-5-methyl-pyrazole and 0.9 g. of paraformaldehyde in 40 ml. of absolute ethanol is treated with 2.14 g. of 4 - (4 - fluorophenyl)-1,2,5,6-tetrahydro-pyradine hydrochloride and 3 drops of concentrated hydrochloric acid and boiled under reflux during 16 hours. The 1-[2-(4-bromophenyl-sulfonyloxy) - ethyl]-4-{3-[4-(4 - fluorophenyl) - 1,2,5,6 - tetrahydro - 1 - pyridyl]-1-oxo-propyl}-5-methyl-pyrazole monohydrochloride of the formula

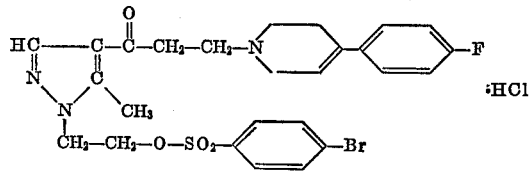

crystallizes out on cooling; after recrystallization from methanol, it melts at 206–207°. The free base is obtained by treatment of an aqueous solution of the salt with a saturated aqueous solution of sodium hydrogen carbonate.

EXAMPLE 48

A mixture of 2.52 g. of 4-acetyl-1-(2-hydroxy-ethyl)-5-methyl-pyrazole and 1.35 g. of paraformaldehyde in 40 ml. absolute ethanol is treated with 3.96 g. of 4-(3-trifluoromethyl-phenyl) - 1,2,5,6-tetrahydro-pyridine hydrochloride and 4 drops of concentrated hydrochloric acid and boiled under reflux for 16 hours. The solution is concentrated to a volume of 10 ml. and diluted with 20 ml. of isopropanol, then again concentrated to a volume of 10 ml. On addition of 20 ml. of dry ether, followed by cooling to 0°, the 1-(2-hydroxyethyl)-5-methyl-4-{1-oxo-3-[4 - (3 - trifluoromethyl-phenyl)-1,2,5,6-tetrahydro-1-pyridyl]-propyl}-pyrazole monohydrochloride of the formula

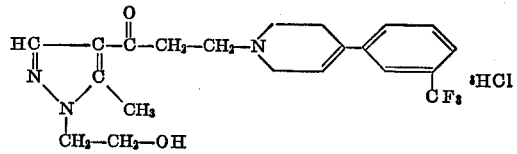

crystallizes out; after recrystallization from a mixture of methanol, isopropanol and ether, it melts at 200°. The free base is obtained by treatment of an aqueous solution of the salt with a saturated aqueous sodium hydrogen carbonate solution.

EXAMPLE 49

A mixture of 4.64 g. of 4-acetyl-1-(3-fluoro-4-methyl-phenyl)-5-methyl-pyrazole and 1.8 g. of paraformaldehyde in 50 ml. of absolute methanol is treated with 4.25 g. of 4-(4-fluorophenyl) - 1,2,5,6-tetrahydro-pyridine hydrochloride and 5 drops of concentrated hydrochloric acid and boiled under reflux for 24 hours. The solution is concentrated to a volume of 10 ml., diluted with 20 ml. of isopropanol, again concentrated to 10 ml. and diluted with 20 ml. of dry ether. On cooling, the 1-(3-fluoro-4-methyl - phenyl) - 4 - {3-[4-(4-fluoro-phenyl)-1,2,5,6-tetrahydro-1-pyridyl]-1-oxo-propyl} - 5 - methyl-pyrazole monohydrochloride of the formula

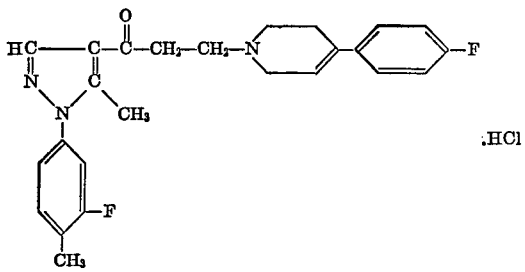

crystallizes out; after recrystallization from a mixture of methanol, isopropanol and ether, it melts at 205–207°. The free base is obtained by treatment of an aqueous solution of the salt with a saturated aqueous sodium hydrogen carbonate solution.

The starting material is prepared as follows:

A solution of 12.5 g. of 3-fluoro-4-methyl-aniline in 62 ml. of concentrated hydrochloric acid is treated at 0° with a solution of 7 g. of sodium nitrite in 31.5 ml. of water. After the diazotisation is complete, the diazonium salt solution is treated dropwise at 0° over a period of 4 hours with a solution of 50 g. of stannous chloride dihydrate in 175 cc. of concentrated hydrochloric acid. The reaction mixture is stirred for an additional 2 hours, then the resulting crystalline precipitate is filtered off, suspended in 100 ml. water and made alkaline with a 25% aqueous solution of sodium hydroxide. The alkaline solution is extracted with benzene, the organic solution is dried over anhydrous sodium sulphate and evaporated to dryness. The residue is dissolved in 50 ml. isopropanol and treated with a 5 N solution of dry hydrogen chloride gas in dry isopropanol. The crystalline precipitate is filtered off and recrystallized from a mixture of methanol and ether to afford the 3-fluoro-4-methyl-phenyl-hydrazine hydrochloride, M.P. 265° (with decomposition). The free base is obtained by treatment of the aqueous solution of the salt with a 2 N aqueous sodium hydroxide solution, followed by extraction with ether.

A solution of 7.4 g. of 3-fluoro-4-methyl-phenyl-hydrazine in 100 ml. of dry ether is added dropwise at 0° to a solution of 8.3 g. of ethoxymethylene-acetylacetone in 50 ml. of dry ether. The reaction mixture is stirred at room temperature for 24 hours, the solvent is then evaporated and the residue is triturated with hexane to yield the 4-acetyl-1-(3-fluoro - 4 - methyl-phenyl)-5-methyl-pyrazole, M.P. 80° after recrystallization from hexane.

EXAMPLE 50

A mixture of 4.64 g. of 4-acetyl-1-(4-fluoro-3-methyl-phenyl)-5-methyl-pyrazole and 1.8 g. of paraformaldehyde in 50 ml. of absolute ethanol is treated with 4.28 g. of 4-(4-fluorophenyl)-1,2,5,6-tetrahydro - pyridine hydrochloride and 5 drops of concentrated hydrochloric acid and boiled under reflux for 24 hours. The solution is concentrated to a volume of 8 ml., diluted with 25 ml. of isopropanol, again concentrated to 10 ml. and diluted with 20 ml. of ether. On cooling, the 1-(4-fluoro-3-methyl-phenyl)-4-{3-[4 - fluorophenyl) - 1,2,5,6 - tetra-hydro-pyridyl]-1-oxo-propyl}-5-methyl - pyrazole monohydrochloride of the formula

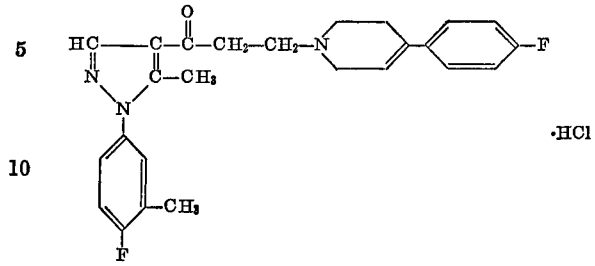

crystallizes out; after recrystallization from a mixture of ethanol and ether, it melts at 198°. The free base is obtained by treatment of an aqueous solution of the salt with a saturated aqueous sodium hydrogen carbonate solution.

The starting material is prepared as follows:

A solution of 18.1 g. of 4-fluoro-3-methyl-aniline in 90 ml. concentrated hydrochloric acid is diazotised and the diazonium salt reduced in the manner described in Example 49. The resulting 4-fluoro-3-methyl-phenyl-hydrazine hydrochloride is recrystallized from a mixture of ethanol and ether, which melts at 198–200° (with decomposition). The free base is obtained by treatment of the aqueous solution of the salt with a 2 N aqueous sodium hydroxide solution, followed by extraction with ether.

A solution of 10.5 g. of 4-fluoro-3-methyl-phenyl-hydrazine in 100 ml. of dry ether is added dropwise at 0° to a solution of 11.7 g. of ethoxymethylene-acetylacetone in 50 ml. of dry ether. The reaction mixture is stirred at room temperature for 24 hours, the solvent is then evaporated and the residue is triturated with benzene to afford 4-acetyl-(4-fluoro-3-methyl-phenyl)-5-methyl-pyrazole, M.P. 146–147° after recrystallization from hexane.

EXAMPLE 51

A mixture of 6.8 g. of 4-acetyl-1-(2-hydroxyethyl)-5-methyl-pyrazole and 3.6 g. of paraformaldehyde in 95 ml. of absolute ethanol is treated with 8.5 g. of 4-hydroxy-4-phenyl-piperidine hydrochloride and 10 drops of concentrated hydrochloric acid and boiled under reflux for 16 hours. The solution is concentrated to a volume of 10 ml., diluted with 10 ml. of dry ether and cooled to 0° for 48 hours. The crystalline precipitate is recrystallized from a mixture of isopropanol and ether to afford the 1-(2-hydroxyethyl) - 4 - [3 - (4 - hydroxy-4-phenyl-piperidino)-1-oxo-propyl]-5-methyl-pyrazole monohydrochloride of the formula

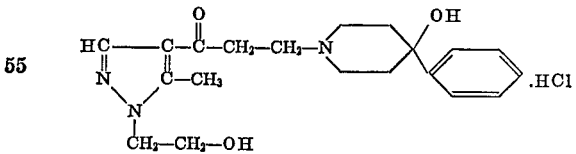

which melts at 220–221°. The free base is obtained by treatment of an aqueous solution of the salt with a saturated aqueous sodium hydrogen carbonate solution.

EXAMPLE 52

A mixture of 2 g. of 1-(2-hydroxyethyl)-4-[3-(4-hydroxy - 4 - phenyl-piperidino)-1-oxo-propyl]-5-methyl-pyrazole monohydrochloride and 20 ml. of concentrated sulphuric acid is allowed to stand at room temperature for one hour. The mixture is poured into ice and made alkaline with a saturated aqueous solution of sodium hydrogen carbonate. The crystalline precipitate is filtered off and recrystallized from a mixture of methylene chloride and hexane to afford the 1-(2-hydroxyethyl)-5-methyl-4-[1-oxo-3-(4-phenyl-1,2,5,6-tetrahydro - 1 - pyridyl)-propyl]-pyrazole, which melts at 145–147°.

EXAMPLE 53

A solution of 6 g. of 1-(3-fluorophenyl)-4-{3-[4-(4-fluorophenyl) - 1,2,5,6 - tetrohydro - 1 - pyridyl]-1-oxo-propyl}-5-methyl-pyrazole monohydrochloride in 200 ml. of 50% aqueous methanol is treated with a 10% aqueous solution of sodium carbonate. The crystalline precipitate is recrystallized from a mixture of methylene chloride and hexane to yield the 1-(3-fluorophenyl)-4-{3-[4-(4-fluorophenyl) - 1,2,5,6 - tetrahydro-1-pyridyl]-1-oxo-propyl}-5-methyl-pyrazole, which melts at 133–135°.

EXAMPLE 54

A solution of 5.2 g. of 1-(3-fluorophenyl)-4-{3-[4-(4-fluorophenyl) - 1,2,5,6 - tetrahydro - 1 - pyridyl]-1-oxo-propyl} - 5 - methyl-pyrazolein in 300 ml. of methanol is treated with a solution of 0.52 g. of sodium borohydride in 10 ml. of 50% aqueous methanol; the reaction mixture is boiled under reflux for 5 hours. On cooling, one obtains a crystalline precipitate which is filtered off and recrystallized from a mixture of methylene chloride and hexane to afford the 1-(3-fluorophenyl)-4-{3-[4-(4-fluorophenyl) - 1,2,5,6 - tetrahydro - 1 - pyridyl] - 1 - hydroxy-propyl}-5-methyl-pyrazole of the formula

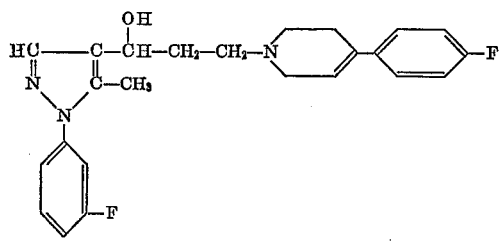

which melts at 126–128°.

EXAMPLE 55

A solution of 13 g. of 1-(4-fluorophenyl)-4-{3-[4-(4-fluorophenyl) - 1,2,5,6 - tetrahydro - 1 - pyridyl]-1-oxo-propyl}-5-methyl-pyrazole monohydrochloride in 300 ml. of 50% aqueous methanol is treated with a 10% aqueous solution of sodium hydroxide. On cooling, a crystalline precipitate is formed, which is filtered off and recrystallized from a mixture of methylene chloride and hexane to afford the 1-(4-fluorophenyl)-4-{3-[4-(4-fluorophenyl) - 1,2,5,6 - tetrahydro - 1 - pyridyl]-1-oxo-propyl}-5-methyl-pyrazole, which melts at 150°.

EXAMPLE 56

A solution of 11 g. of 1-(4-fluorophenyl)-4-{3-[4-(4-fluorophenyl) - 1,2,5,6 - tetrahydro - 1 - pyridyl]-1-oxo-propyl}-5-methyl-pyrazole in 500 ml. of methanol is treated with 1.1 g. of sodium borohydride in 20 ml. of 50% aqueous methanol; the reaction mixture is boiled under reflux for 5 hours. On cooling, a crystalline precipitate is formed which is filtered off and recrystallized from a mixture of methylene chloride and hexane to afford the 1 - (4 - fluorophenyl)-4-{3-[4-(4-fluorophenyl) - 1,2,5,6-tetrahydro - 1 - pyridyl] - 1 - hydroxy-propyl}-5-methyl-pyrazole of the formula

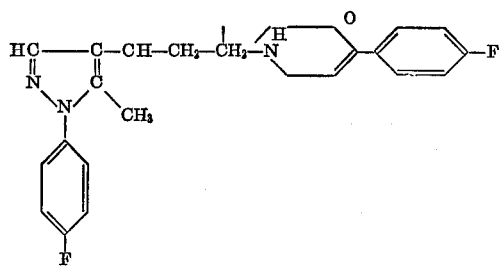

which melts at 157–158°.

EXAMPLE 57

20 g. of 4-{3-[4-(4-fluorophenyl)-1,2,5,6-tetrahydro-1-pyridyl]-1-oxo-propyl}-1-(2-hydroxyethyl) - 5 - methyl-pyrazole citrate and 130 g. of corn starch are intimately mixed and treated with a paste made of 30 g. of corn starch and 100 g. of distilled water. The mass is thoroughly kneaded, granulated and dried at 45°. A mixture of 14 g. of talc and 6 g. of magnesium stearate is added to the granules and the mixture is thoroughly mixed and then converted to tablets each containing 0.01 g. or 0.05 g. of the active ingredient.

EXAMPLE 58

A mixture of 6.9 g. of 4-acetyl-1,5-dimethyl-pyrazole and 4.5 g. of paraformaldehyde in 110 ml. of isopropanol is treated with 8.5 g. of 4,4-pentamethylenepiperidine hydrochloride and 1.5 ml. of concentrated hydrochloric acid; the reaction mixture is boiled under reflux for 24 hours. On cooling to room temperature, the 4-[3-(3-aza-3-spiro[5.5]undecyl)-1-oxopropyl] - 1,5 - dimethyl-pyrazole monohydrochloride of the formula

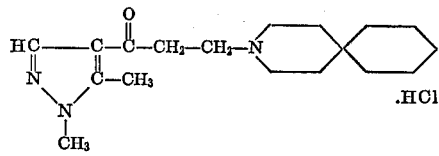

crystallizes out; it melts at 258° (with decomposition) after recrystallization from a mixture of methanol and ether. The free base is obtained by treatment of an aqueous solution of the above salt with a 1 N aqueous sodium hydroxide solution.

EXAMPLE 59

A mixture of 8.1 g. of 4-acetyl-1-[2-(4-fluorophenyl-sulfonyloxy) - ethyl] - 5 - methyl-pyrazole and 2.25 g. of paraformaldehyde in 80 ml. of absolute ethanol is treated with 4.88 g. of 4-phenyl-1,2,5,6-tetrahydro-pyridine hydrochloride and 0.8 ml. of concentrated hydrochloric acid and boiled under reflux for 16 hours. The 1-[2-(4-fluorophenylsulfonyloxy)-ethyl]-5-methyl - 4 - [3 - (4 - phenyl-1,2,5,6-tetrahydro-1-pyridyl) - 1 - oxo-propyl]-pyrazole monohydrochloride of the formula

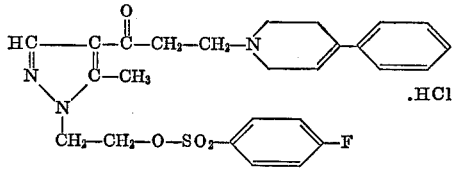

which melts at 183° after recrystallization from a mixture of methanol and isopropanol. The free base is prepared by the treatment of an aqueous solution of the above salt with saturated aqueous solution of sodim hydrogen carbonate.

The starting material is prepared as follows:

A solution of 21.84 g. of 4-acetyl-1-(2-hydroxyethyl)-5-methyl-pyrazole in 250 ml. of dry tetrahydrofuran and 15.15 g. of triethylamine is treated with a solution of 25.35 g. of 4-fluorophenyl-sulfonylchloride in 150 ml. of dry tetrahydrofuran; the reaction mixture is boiled under reflux for 4 hours and filtered hot. The filtrate is evaporated to dryness and the residue is suspended in water and extracted with ethyl acetate; the organic extract is dried over anhydrous sodium sulfate and evaporated to dryness. The residue is recrystallized from a mixture of isopropanol and hexane to afford the 4-acetyl-1-[2-(4-fluoro-phenyl-sulfonyloxy)-ethyl] - 5 - methyl-pyrazole, M.P. 107–108°.

EXAMPLE 60

A mixture of 8.1 g. of 4-acetyl-1-[2-(4-fluorophenyl-sulfonyloxy) - ethyl] - 5 - methyl-pyrazole and 2.25 g. of paraformaldehyde in 80 ml. of absolute ethanol is treated with 5.35 g. of 4-(4-fluorophenyl)-1,2,5,6-tetrahydropyridine hydrochloride and 0.8 ml. of concentrated hydrochloric acid and boiled under reflux for 16 hours. The resulting 1-[2-(4 - fluorophenyl-sulfonyloxy)-ethyl]-4-{3-[4-(4-fluorophenyl) - 1,2,5,6 - tetrahydro - 1 - pyridyl]-1-oxo-propyl}-5-methyl-pyrazole monohydrochloride of the formula

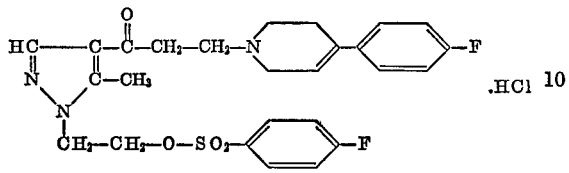

melts at 165–167° after recrystallization from a mixture of ethanol and ether. The free base is obtained by treatment of an aqueous solution of the salt with a saturated aqueous solution of sodium hydrogen carbonate.

EXAMPLE 61

A solution of 3.33 g. of 4-{3-[4-(4-fluorophenyl)-1,2,5,6-tetrahydro-1-pyridyl] - 1 - oxo - propyl}-1-(2-hydroxyethyl)-5-methyl-pyrazole in 100 ml. tetrahydrofuran and 1.5 g. of triethylamine is treated with 1.95 g. of 4-fluorophenylsulfonylchloride in 50 ml. of tetrahydrofuran; the reaction mixture is boiled under reflux for 4 hours and filtered hot. The filtrate is evaporated to dryness and the residue is treated with ethanolic hydrogen chloride. The resulting crystalline precipitate is recrystallized from a mixture of methanol and isopropanol to afford the 1-[2-(4 - fluorophenylsulfonyloxy)-ethyl]-4-{3-[4-(4-fluorophenyl)-1,2,5,6 - tetrahydro - 1 - pyridyl]-1-oxo-propyl}-5-methyl-pyrazole hydrochloride; the product is identical with the compound described in Example 60; it melts at 165–167° and the mixed melting point with compound of Example 60 remains unchanged.

EXAMPLE 62

A solution of 6.86 g. of 4-acetyl-1-[2-(4-chlorophenyl-sulfonyloxy)-ethyl]-5-methyl-pyrazole and 1.8 g. of paraformaldehyde in 60 ml. absolute ethanol is treated with 4.28 g. of 4-(4-fluorophenyl)-1,2,5,6-tetrahydro-pyridine hydrochloride and 0.66 ml. of concentrated hydrochloric acid and boiled under reflux for 16 hours. The 1-[2-(4-chlorophenyl-sulfonyloxy)-ethyl] - 4 - {3-[4-(4-fluorophenyl)-1,2,5,6-tetrahydro - 1 - pyridyl] - 1 - oxo-propyl}-5-methyl-pyrazole monohydrochloride of the formula

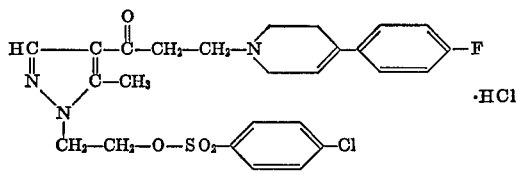

which melts at 180–182° after recrystallization from a mixture of methanol, isopropanol and ether. The free base is obtained by treatment of an aqueous solution of the salt with a saturated aqueous sodium hydrogen carbonate solution.

The starting material is prepared as follows:

A solution of 21.84 g. of 4-acetyl-1-(2-hydroxy-ethyl)-5-methyl-pyrazole in 250 ml. of tetrahydrofuran and 15.15 g. of triethylamine is treated with a solution of 27.43 g. of 4-chloro-phenyl-sulfonyl chloride in 150 ml. of dry tetrahydrofuran. The reaction mixture is boiled under reflux for 4 hours, filtered hot and evaporated to dryness. The residue is suspended in 100 ml. water and extracted with ethyl acetate. The organic extract is dried with anhydrous sodium sulfate and evaporated to dryness. The residue is recrystallized from a mixture of methylene chloride and hexane to yield the 4-acetyl-1-[2-(4-chlorophenyl-sulfonyloxy)-ethyl] - 5 - methyl - pyrazole, M.P. 125–126°.

EXAMPLE 63

A mixture of 6.86 g. of 4-acetyl-1-[2-(4-chlorophenyl-sulfonyloxy)-ethyl] - 5 - methyl - pyrazole and 1.8 g. of paraformaldehyde in 60 ml. of absolute ethanol is treated with 3.92 g. of 4-phenyl-1,2,5,6 - tetrahydro - pyridine hydrochloride and 0.66 ml. of concentrated hydrochloric acid and boiled under reflux for 16 hours. The 1-[2-(4-chlorophenyl-sulfonyloxy)-ethyl] - 5 - methyl - 4 - [3-(4-phenyl-1,2,5,6-tetrahydro - 1 - pyridyl) - 1 - oxo-propyl]-pyrazole monohydrochloride of the formula

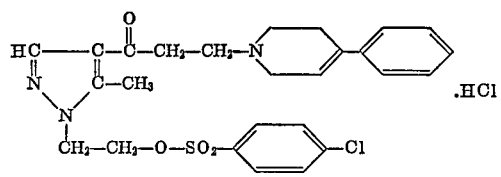

melts at 200° after recrystallization from methanol. The free base is obtained by treatment of an aqueous solution of the above salt with a saturated aqueous sodium hydrogen carbonate solution.

EXAMPLE 64

A mixture of 4.8 g. of 4-acetyl-1-(2-dimethylamino-ethyl)-5-methyl-pyrazole and 2.25 g. of paraformaldehyde in 50 ml. isopropanol is treated with 4.8 g. of 4-phenyl-1,2,5,6-tetrahydro-pyridine hydrochloride and 8 drops of concentrated hydrochloric acid; the reaction mixture is boiled under reflux for 16 hours. The solvent is distilled off, the residue is triturated with ethereal hydrogen chloride, and on cooling to 0° for 24 hours, a crystalline precipitate is formed which is filtered off and recrystallized from a mixture of isopropanol and ether to afford the 1-(2-dimethylaminoethyl) - 4 - [1 - oxo - 3-(4-phenyl-1,2,5,6-tetrahydro - 1 - pyridyl) - propyl] - 5-methyl-pyrazole dihydrochloride of the formula

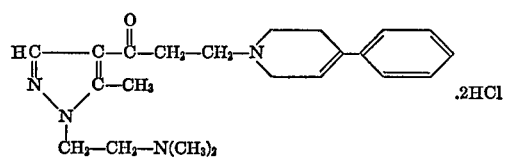

which melts as the monohydrate at 185–186°. The free base is obtained by treatment of an aqueous solution of the above salt with a saturated aqueous solution of sodium hydrogen carbonate.

The starting material is prepared as follows:

A solution of 5.7 g. of ethoxymethylene-acetylacetone in 150 ml. ether is treated at 0° dropwise with 39 g. of 2-dimethylaminoethyl-hydrazine in 350 ml. of ether. The reaction mixture is stirred at room temperature for 24 hours and then evaporated to dryness. The residual oil is redissolved in ether and treated with a saturated solution of maleic acid in isopropanol. A crystalline precipitate is formed which is filtered and recrystallized from a mixture of isopropanol and ether to afford the 4-acetyl-1-(2-dimethylaminoethyl)-5 - methyl - pyrazole maleate, M.P. 142–143°. The free base is obtained from this salt by treatment of the latter with aqueous ammonium hydroxide.

EXAMPLE 65

A mixture of 7.8 g. of 4-acetyl - 1 - (2 - diethylamino-ethyl) - 5 - methyl - pyrazole hydrochloride and 2.7 g. of paraformaldehyde in 80 ml. of isopropanol is treated with 5.8 g. of 4-phenyl-1,2,5,6-tetrahydro-pyridine hydrochloride and 10 drops of concentrated hydrochloric acid; the reaction mixture is boiled under reflux for 16 hours. On cooling and addition of ether, the 1-(2-diethylamino-ethyl)-4-[1-oxo-3-(4 - phenyl - 1,2,5,6 -tetrahydro - 1- pyridyl)-propyl] - 5 - methylpyrazole dihydrochloride of the formula

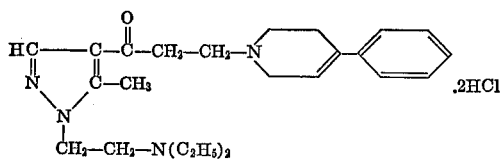

is obtained, which melts as the monohydrate at 177–178° after recrystallization from a mixture of ethanol and ether. The free base is obtained by treatment of the aqueous solution of the salt with a saturated aqueous solution of sodium hydrogen carbonate.

The starting material is prepared as follows:

A solution of 46.8 g. of ethoxymethylene-acetyl-acetone in 150 ml. of dry ether is treated dropwise at 0° with 39.3 g. of 2-diethylaminoethyl-hydrazine in 300 ml. of ether. The reaction mixture is stirred at room temperature for 24 hours and then evaporated to dryness. The residual oil is redissolved in ether and treated with an isopropanol solution of hydrogen chloride. A crystalline precipitate is formed which is filtered off and recrystallized from a mixture which is filtered off and recrystallized from a mixture of ethanol and ether to afford the 4-acetyl-1-(2-diethylamino-ethyl)-5 - methyl - pyrazole hydrochloride, M.P. 190°.

EXAMPLE 66

A mixture of 8.16 g. of 4-acetyl-1-(2-piperidino-ethyl)-5-methyl-pyrazole and 2.7 g. of paraformaldehyde in 80 ml. isopropanol is treated with 5.9 g. of 4-phenyl-1,2,5,6-tetrahydro-pyridine hydrochloride and 1 ml. of concentrated hydrochloric acid; the reaction mixture is boiled under reflux for 16 hours. The solvent is distilled off and the residue is triturated with ether to afford a crystalline precipitate which is recrystallized from a mixture of ethanol and ether to afford the 5-methyl-4-[1-oxo-3-(4-phenyl - 1,2,5,6-tetrahydro-1-pyridyl)-propyl]-1-(2-piperidino-ethyl)-pyrazole dihydrochloride of the formula

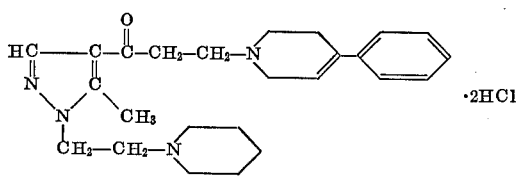

which melts as the monohydrate at 78–80°. The free base is obtained by treatment of an aqueous solution of the above salt with a saturated aqueous solution of sodium hydrogen carbonate.

The starting material is prepared as follows:

A solution of 78 g. of ethoxymethylene-acetylacetone in 400 ml. chloroform is treated dropwise at 0° with a solution of 71 g. of 2-piperidinoethyl-hydrazine in 350 ml. of chloroform. The reaction mixture is stirred for 16 hours at room temperature; the solvent is then evaporated and the red oil is filtered through a column of aluminum oxide. The yellow eluate is dissolved in isopropanol and treated with a solution of hydrogen chloride in isopropanol. A crystalline precipitate is formed, which is filtered off and recrystallized from a mixture of ethanol and ether to afford the 4 - acetyl-1-(2-piperidino-ethyl)-5-methyl-pyrazole, M.P. 212–213°.

EXAMPLE 67

A mixture of 2.3 g. of 4-acetyl-5-methoxymethyl-1-phenyl-pyrazole and 0.96 g. of paraformaldehyde in 30 ml. of absolute ethanol is treated with 1.96 g. of 4-phenyl-1,2,5,6-tetrahydro-pyridine hydrochloride and 4 drops of concentrated hydrochloric acid; the reaction mixture refluxed for 16 hours, then concentrated to a volume of 10 ml. and diluted with 20 ml. of ether. The crystalline precipitate is filtered off and recrystallized from a mixture of methanol, isopropanol and ether to afford the 5-methoxymethyl - 1 - phenyl - 4 - [3-(4-phenyl-1,2,5,6-tetrahydro-1-pyridyl)-1-oxo-propyl]-pyrazole monohydrochloride of the formula

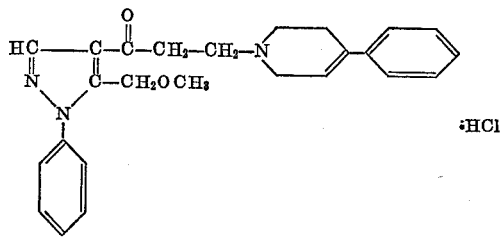

which melts at 180–181°. The free base is obtained by treatment of an aqueous solution of the above salt with a saturated aqueous solution of sodium hydrogen carbonate.

The starting material is prepared as follows:

A mixture of 65 g. of 1-methoxy-2,4-pentadione, 100 g. of triethyl orthoformate and 200 ml. of acetic anhydride is boiled under reflux for 2 hours. The reaction mixture is concentrated to remove ethyl acetate and excess acetic anhydride, and the residual oil is distilled; the 3-ethoxymethylene-1-methoxy-2,4-pentadione is obtained at 132–136°/0.8 mm. Hg.

A solution of 18.4 g. of 3-ethoxymethylene-1-methoxy-2,4-pentadione in 100 ml. of dry ether is treated at 0° and over a period of 2 hours with an ethereal solution of 10.8 g. of phenyl-hydrazine in 200 ml. ether. The reaction mixture is stirred at room temperature for 24 hours; the solvent is then evaporated off and the residue is dissolved in benzene and filtered through a column of 380 g. of aluminum oxide. The yellow eluate is evaporated and in the presence of ether, isopropanol and hexane and at 10°, furnishes a crystalline material, which is filtered off and recrystallized from hexane to yield the 4-acetyl-5-methoxymethyl-1-phenyl-pyrazole, M.P. 48°.

EXAMPLE 68

A mixture of 2.3 g. of 4-acetyl-5-methoxymethyl-1-phenyl-pyrazole and 0.96 g. of paraformaldehyde in 30 ml. of absolute ethanol is treated with 2.15 g. of 4-(4-fluorophenyl) - 1,2,5,6-tetrahydro-pyridine hydrochloride and 4 drops of concentrated hydrochloric acid and boiled under reflux for 24 hours. On cooling, the crystalline 4-{3 - [4 - (4-fluorophenyl)-1,2,5,6-tetrahydro-1-pyridyl]-1-oxo-propyl} - 5-methoxymethyl-1-phenyl-pyrazole hydrochloride of the formula

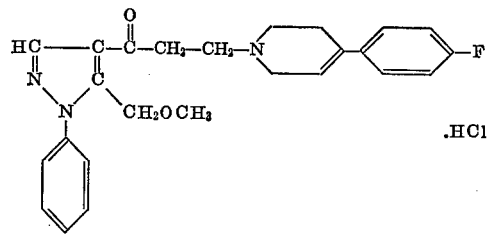

is obtained, which melts at 190° after recrystallization from methanol. The free base is obtained by treating the hydrochloride salt with a 1 N aqueous sodium hydroxide solution.

EXAMPLE 69

A solution of 10 g. of 4-{3-[4-(4-fluorophenyl)-1,2,5,6-tetrahydro - 1 - pyridyl]-1-oxo-propyl}-1-(2 - hydroxyethyl)-5-methyl-pyrazole in 17.5 ml. methanol is treated dropwise with 1.2 g. of sodium borohydride in 30 ml. of 50% aqueous methanol. The reaction mixture is boiled under reflux for 8 hours, then evaporated to dryness; the residue is taken up in ethyl acetate, washed with water, dried and evaporated to dryness. The residue is recrystallized from a mixture of methylene chloride and hexane to afford the 4-{3-[4-(4-fluorophenyl)-1,2,5,6-tetrahydro- 1 - pyridyl] - 1 - hydroxypropyl} - 1 - (2-hydroxyethyl)-5-methyl-pyrazole of the formula

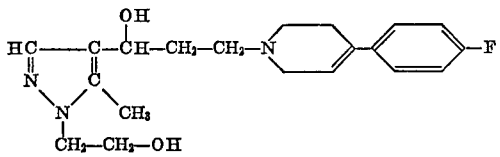

which melts at 93°.

EXAMPLE 70

A solution of 3.4 g. of 1-(2-hydroxyethyl)-5-methyl-4-[1 - oxo - 3 - (4-phenyl-1,2,5,6-tetrahydro-1-pyridyl)-propyl]-pyrazole in 80 ml. methanol is treated dropwise with 0.52 g. of sodium borohydride in 30 ml. of 50% aqueous methanol and boiled under reflux for 16 hours, then evaporated to dryness. The residue is taken up in ethyl acetate and washed with water, dried and evaporated to dryness. The residue is recrystallized from a mixture of methylene chloride and hexane to afford the 1-(2-hydroxyethyl)-4-[1-hydroxy-3-(4 - phenyl - 1,2,5,6 - tetrahydro-1-pyridyl)-propyl]-5-methyl-pyrazole of the formula

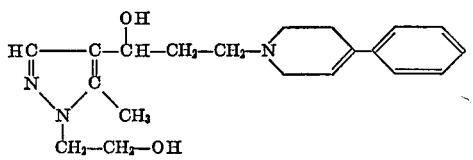

which melts at 98°.

EXAMPLE 71

A solution of 12 g. of 1-(2-fluorophenyl)-4-{3-[4-(4-fluorophenyl)-1,2,5,6 - tetrahydro-1 - pyridyl]-1-oxopropyl}-5-methyl-pyrazole in 400 ml. methanol is treated with a solution of 1.5 g. of sodium borohydride in 20 ml. of 50% aqueous methanol; the reaction mixture is boiled under reflux for 5 hours, and on cooling, one obtains a crystalline precipitate which is filtered off and recrystallized from a mixture of methylene chloride and hexane to afford the 1-(2-fluorophenyl)-4-{3-[4-(4-fluorophenyl)-1,2,5,6-tetrahydro-1-pyridyl] - 1 - hydroxypropyl}-5-methyl-pyrazole of the formula

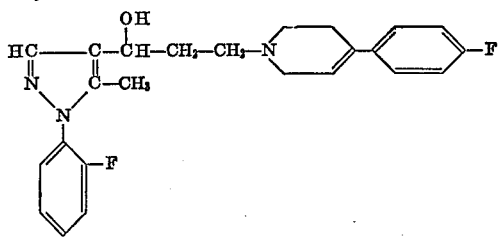

which melts at 122–123°.

EXAMPLE 72

A solution of 13.5 g. of 1-(2-hydroxyethyl)-4-{3-[4-(4-fluorophenyl) - 1,2,5,6 - tetrahydro-1-pyridyl]-1-oxopropyl}-5-methyl-pyrazole citrate in 400 ml. of methanol is hydrogenated in the presence of 0.65 g. of Adam's platinum oxide catalyst; one mole of hydrogen is absorbed within one hour. The reaction mixture is filtered to remove the catalyst and the filtrate is evaporated to dryness. The residue is recrystallized from a mixture of methanol, isopropanol and ether to afford the citrate of 4-{3-[4-(4-fluorophenyl)-piperidino]-1-oxo - propyl}-1-(2-hydroxyethyl)-5-methyl-pyrazole of the formula

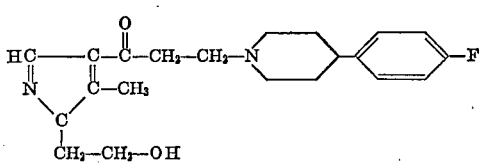

which melts at 105°.

EXAMPLE 73

A mixture of 21 g. of 4-acetyl-1-(2-hydroxyethyl)-5-methyl-pyrazole and 11.25 g. of paraformaldehyde in 45 ml. of ethanol is treated with 24.5 g. of 4-(4-fluorophenyl)-1,2,5,6-tetrahydro-pyridine hydrochloride and 425 ml. of concentrated hydrochloric acid and boiled under reflux for 16 hours. The 1-(2-hydroxyethyl)-5-methyl-4-[1-1-oxo-3-(4 - phenyl - 1,2,5,6-tetrahydro-1-pyridyl)-propyl]-pyrazole monohydrochloride of the formula

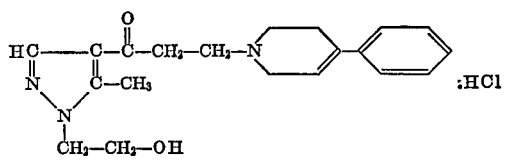

crystallizes on cooling. After recrystallization from a mixture of isopropanol and ether, it melts at 152°.

EXAMPLE 74

A mixture of 4.36 g. of 4-acetyl-1-(3-fluorophenyl)-5-methyl-pyrazole and 1.8 g. of paraformaldehyde in 50 ml. of absolute ethanol is treated with 4.28 g. of 4-(4-fluorophenyl)-1,2,5,6-tetrahydro-pyridine hydrochloride and 6 drops of concentrated hydrochloric acid and boiled under reflux for 16 hours. The 1-(3-fluorophenyl)-4-{3-[4-(4-fluorophenyl) - 1,2,5,6 - tetrahydro-1-pyridyl]-1-oxo-propyl}-5-methyl-pyrazole hydrochloride of the formula

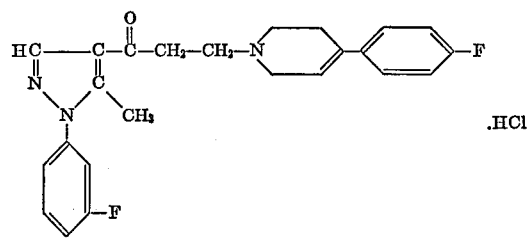

crystallizes on cooling; after recrystallization from a mixture of methanol and isopropanol, it melts at 206°.

EXAMPLE 75

A mixture of 2.97 g. of 4-acetyl-1-(2-hydroxyethyl)-5-methoxymethyl-pyrazole and 1.35 g. of paraformaldehyde in 45 ml. ethanol is treated with 3.19 g. of 4-(4-fluorophenyl)-1,2,5,6-tetrahydro-pyridine hydrochloride and a small amount of concentrated hydrochloric acid, refluxed for 16 hours and worked up as shown in Example 67. The resulting 4-{3-[4-(4-fluorophenyl)-1,2,5,6-tetrahydro - 1 - pyridyl] - 1 - oxo-propyl}-1-(2-hydroxyethyl)-5-methoxymethyl-pyrazole hydrochloride of the formula

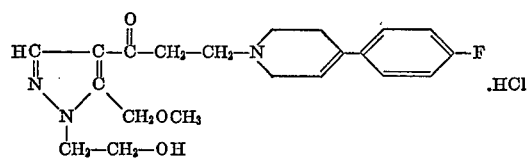

melts at 195° after recrystallization from a mixture of methanol and isopropanol.

The starting material is prepared according to the procedure described in Example 67, 18.6 g. of the 3-ethoxymethylene-1-methoxy-2,4-pentane-dione and 7.6 g. of the 2-hydroxyethyl-hydrazine being used; the desired 4-acetyl-1-(2-hydroxyethyl)-5-methoxymethyl-pyrazole melts at 59–60° after crystallization from hexane.

What is claimed is:

1. A member selected from the group consisting of compounds of the formula

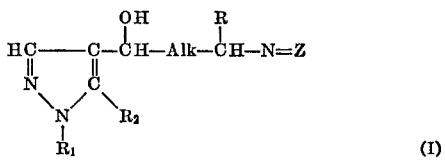

(I)

in which $R_1$ is a member selected from the group consisting of hydrogen, lower alkyl and lower alkyl substituted by hydroxy, $R_2$ is a member selected from the group consisting of lower alkyl and lower alkoxy-lower alkyl, Alk is 1,1-lower alkylidene, R is a member selected from the group consisting of hydrogen and lower alkyl, and —N=Z is 1,2,5,6-tetrahydro-1-pyridyl substituted in 4-position by a member selected from the group consisting of phenyl and phenyl substituted by a member selected from the group consisting of lower alkyl, lower alkoxy, lower alkyl-mercapto, lower alkanoyloxy, halogeno, trifluoromethyl, carbo-lower alkoxy, lower alkanoyl, amino, di-lower alkyl-amino and nitro, and pharmaceutically acceptable salts thereof.

2. A compound according to claim 1 and being selected from the group consisting of a compound having the Formula I according to claim 1, in which $R_1$ stands for a member selected from the group consisting of lower alkyl and lower alkyl substituted by hydroxy, $R_2$ is a member selected from the group consisting of lower alkyl and lower alkoxy-lower alkyl, Alk is methylene, R is hydrogen and the residue —N=Z is 1,2,5,6-tetrahydro-1-pyridyl substituted in 4-position by a member selected from the group consisting of phenyl and phenyl substituted by a member selected from the group consisting of lower alkyl, halogeno, trifluoromethyl, lower alkoxy, amino and nitro, and pharmaceutically acceptable salts thereof.

3. Compounds as claimed in claim 1 and being a member selected from the group consisting of a compound having the Formula I according to claim 1, in which $R_1$ represents a member selected from the group consisting of β-hydroxy-lower alkyl and γ-hydroxy-lower alkyl, $R_2$ is a member selected from the group consisting of methyl and methoxymethyl, R is hydrogen, Alk is methylene, and —N=Z is 1,2,5,6-tetrahydro-1-pyridyl substituted in 4-position by a member selected from the group consisting of phenyl and phenyl substituted by a member selected from the group consisting of fluoro, chloro, bromo, methyl, methoxy, trifluoromethyl, amino and nitro, and pharmaceutically acceptable salts thereof.

4. Compounds as claimed in claim 1 and being selected from the group consisting of compounds having the Formula I according to claim 1, in which $R_1$ is β-hydroxyethyl, $R_2$ is a member selected from the group consisting of methyl and methoxy-methyl, R is hydrogen, Alk is methylene and —N=Z is 1,2,5,6-tetrahydro-1-pyridyl substituted in 4-position by a member selected from the group consisting of phenyl and phenyl substituted by a member selected from the group consisting of fluoro, chloro, bromo, methyl, methoxy trifluoromethyl, amino and nitro, and pharmaceutically acceptable salts thereof.

5. A compound as shown in claim 1 and being a member selected from the group consisting of 4-{3-[4-fluorophenyl)-1,2,5,6-tetrahydro - 1 - pyridyl]-1-hydroxy-propyl}-1-(2-hydroxyethyl)-5-methyl-pyrazole and pharmaceutically acceptable salts thereof.

6. A compound as shown in claim 1 and being a member selected from the group consisting of 1-(2-hydroxyethyl)-5-methyl-4-[3-(4-phenyl - 1,2,5,6 - tetrahydro-pyridyl)-1-hydroxypropyl]-pyrazole and salts thereof.

References Cited

UNITED STATES PATENTS 2,833,779   5/1958   Fields et al. _____ 260—296

HENRY R. JILES, Primary Examiner

M. A. M. CROWDER, Assistant Examiner

U.S. Cl. X.R.

260—295 R, 296 R; 424—274